(12) United States Patent
Stephan et al.

(10) Patent No.: US 7,514,694 B2
(45) Date of Patent: Apr. 7, 2009

(54) NEUTRON DETECTOR

(75) Inventors: Andrew C. Stephan, Knoxville, TN (US); Vincent D. Jardret, Powell, TN (US)

(73) Assignee: Material Innovations, Inc., Knoxville, TN (US)

( * ) Notice: Subject to any disclaimer, the term of this patent is extended or adjusted under 35 U.S.C. 154(b) by 0 days.

(21) Appl. No.: 11/820,346

(22) Filed: Jun. 19, 2007

(65) Prior Publication Data

US 2008/0315109 A1    Dec. 25, 2008

(51) Int. Cl.
*G01T 3/00* (2006.01)

(52) U.S. Cl. .................................. 250/390.01

(58) Field of Classification Search ............ 250/390.01, 250/390.02, 390.03, 390.04, 390.05, 390.06, 250/390.07, 390.08, 390.09, 390.1, 390.11, 250/390.12
See application file for complete search history.

(56) References Cited

U.S. PATENT DOCUMENTS

| | | | |
|---|---|---|---|
| 4,330,710 A | 5/1982 | Tomassino et al. |
| 4,795,910 A | 1/1989 | Henderson et al. |
| 5,029,262 A | 7/1991 | Schulte |
| 5,036,202 A | 7/1991 | Schulte |
| 5,036,546 A | 7/1991 | Gottesman et al. |
| 5,073,715 A | 12/1991 | Chuiton et al. |
| 5,078,951 A | 1/1992 | August, Jr. |
| 5,204,527 A | 4/1993 | Buchanan |
| 5,281,822 A | 1/1994 | Albrecht et al. |
| 5,345,084 A | 9/1994 | Byrd |
| 5,399,863 A | 3/1995 | Carron et al. |
| 5,659,177 A | 8/1997 | Schulte |
| 5,680,423 A | 10/1997 | Perkins et al. |
| 5,880,469 A | 3/1999 | Miller |
| 5,940,460 A | 8/1999 | Seidel et al. |
| 6,349,124 B1 | 2/2002 | Kronenberg et al. |
| 6,423,972 B1 | 7/2002 | Fehrenbacher et al. |
| 6,495,837 B2 | 12/2002 | Odom et al. |
| 6,528,797 B1 | 3/2003 | Benke et al. |
| 6,545,422 B1 | 4/2003 | George et al. |
| 6,566,657 B2 | 5/2003 | Odom et al. |
| 6,570,335 B1 | 5/2003 | George et al. |
| 6,594,332 B1 | 7/2003 | Kronenberg et al. |

(Continued)

OTHER PUBLICATIONS

A.S. Tremsin et al., "Very compact high performance microchannel plate thermal neutron collimators" IEEE Trans. Nucl. Sci. 51 [3], pp. 1020-1024 (2004).

(Continued)

*Primary Examiner*—Constantine Hannaher
(74) *Attorney, Agent, or Firm*—Robert J. Lauf

(57) ABSTRACT

A neutron detector has a volume of neutron moderating material and a plurality of individual neutron sensing elements dispersed at selected locations throughout the moderator, and particularly arranged so that some of the detecting elements are closer to the surface of the moderator assembly and others are more deeply embedded. The arrangement captures some thermalized neutrons that might otherwise be scattered away from a single, centrally located detector element. Different geometrical arrangements may be used while preserving its fundamental characteristics. Different types of neutron sensing elements may be used, which may operate on any of a number of physical principles to perform the function of sensing a neutron, either by a capture or a scattering reaction, and converting that reaction to a detectable signal. High detection efficiency, an ability to acquire spectral information, and directional sensitivity may be obtained.

15 Claims, 13 Drawing Sheets

U.S. PATENT DOCUMENTS

| | | | |
|---|---|---|---|
| 6,612,889 | B1 | 9/2003 | Green et al. |
| 6,614,867 | B1 | 9/2003 | Kronenberg et al. |
| 6,620,012 | B1 | 9/2003 | Johnson et al. |
| 6,625,243 | B1 | 9/2003 | Kronenberg et al. |
| 6,639,210 | B2 | 10/2003 | Odom et al. |
| 6,654,434 | B1 | 11/2003 | Kronenberg et al. |
| 6,654,435 | B1 | 11/2003 | Kronenberg et al. |
| 6,678,343 | B1 | 1/2004 | Kronenberg et al. |
| 6,707,047 | B2 | 3/2004 | Craig et al. |
| 6,714,616 | B1 | 3/2004 | Kronenberg et al. |
| 6,717,999 | B1 | 4/2004 | Kronenberg et al. |
| 6,727,505 | B2 | 4/2004 | Benke et al. |
| 6,765,978 | B1 | 7/2004 | Kronenberg et al. |
| 6,806,474 | B2 | 10/2004 | McGregor et al. |
| 6,928,130 | B1 | 8/2005 | Kronenberg et al. |
| 6,954,512 | B1 | 10/2005 | Kronenberg et al. |
| 6,989,541 | B2 | 1/2006 | Penn |
| 7,125,305 | B2 | 10/2006 | Green et al. |
| 7,375,342 | B1 * | 5/2008 | Wedding ............ 250/385.1 |
| 2004/0227098 | A1 | 11/2004 | Tarabrine |
| 2005/0094758 | A1 | 5/2005 | Ronaldson et al. |
| 2005/0161611 | A1 | 7/2005 | Disdier et al. |
| 2005/0224719 | A1 | 10/2005 | Polichar et al. |
| 2005/0258372 | A1 | 11/2005 | McGregor et al. |
| 2006/0017000 | A1 | 1/2006 | Martoff |
| 2006/0023828 | A1 | 2/2006 | McGregor et al. |
| 2006/0043308 | A1 | 3/2006 | McGregor et al. |
| 2006/0056573 | A1 | 3/2006 | McGregor et al. |

OTHER PUBLICATIONS

D.P. Hutchinson et al., "Large area combined neutron/gamma detector for homeland security" Detector/Sensor R&T Conf., Gatlinburg, TN, Sep. 14-16, 2004.

S. Pozzi and K. Bekar, "Analysis of time correlation measurements with the active well coincidence counter" Symp. on Int'l Safeguards, Vienna, Austria Oct. 16-20 (2006).

H. Ing et al. "ROSPEC—a simple reliable high resolution neutron spectrometer" Radiation Protection Dosimetry 70 [1-4], pp. 273-278 (1997).

M. Kocsis, "The micro void neutron detector," Nuclear Instruments and Methods in Physics Research A, 529, pp. 354-357 (2004).

G. F. Knoll, T. M. Henderson, W. J. Felmlee, "A Novel 3He Scintillation Detector," IEEE Transactions on Nuclear Science NS-34 (1), pp. 470-474 (1987).

G. F. Knoll, et al., "Light Collection in Scintillation Detector Composites for Neutron Detection," IEEE Transactions on Nuclear Science 35 (1), pp. 872-875 (1988).

M. Lorikyan, "The porous multiwire detector," Nuclear Instruments and Methods in Physics Research A 454 (1), pp. 257-259 (2000).

A. K. Drukier, J. Igalson, L. Sniadower, "A new detector of neutrons," Nuclear instruments and Methods 154 (1), pp. 91-94 (1978).

F. D. Brooks, H. Klein, "Neutron spectrometry—historical review and present status," Nuclear Instruments and Methods in Physics Research A 476, pp. 1-11 (2002).

H. Toyokawa, et al, "A spherical neutron counter with an extended energy response for dosimetry," Radiation Protection Dosimetry 70 (1-4), pp. 365-370 (1997).

S. Yamaguchi et al., "Spherical neutron detector for space neutron measurement," Nuclear Instruments and Methods in Physics Research A 422, pp. 600-605 (1999).

R. A. Craig et al, "Performance of moderating neutron spectrometers that use scintillating fibers," Transactions of the American Nuclear Society, vol. 83, pp. 258-259 (2000).

D. G. Sarantites et al., "'Neutron shell:' a high efficiency array of neutron detectors . . . ," Nucl. Instr. and Meth. in Phys. Res. A 530, pp. 473-492 (2004).

* cited by examiner

NEUTRON DETECTOR

STATEMENT REGARDING FEDERALLY SPONSORED RESEARCH

The United States Government has rights in this invention pursuant to contract No. DE-AC05-00OR22725 between the United States Department of Energy and UT-Battelle, LLC. and Agreement No. HSHQPA-05-9-00047 awarded by the U.S. Department of Homeland Security to Material Innovations, Inc.

CROSS-REFERENCE TO RELATED APPLICATION

This application contains material disclosed in part in U.S. patent application Ser. No. 11/820,261 filed by the present inventors on even date herewith, the entire disclosure of which is incorporated herein by reference.

BACKGROUND OF THE INVENTION

1. Field of the Invention

The invention pertains to apparatus and methods for detecting neutrons and more particularly to neutron detectors containing multiple detecting elements distributed within a volume of neutron moderating material.

2. Description of Related Art

Neutron detection is used in national security (e.g. protection against nuclear terrorism), scientific research (e.g. neutron scattering for materials research), health physics (e.g. monitoring and control of personnel exposure at nuclear power plants), and other application areas. Neutron detector requirements vary according to the application area and specific intended use and can range from simple counting to detecting the presence of a neutron source and providing information about its identity and location. In general, most neutron detectors do not perform in an optimal way for their intended use and the performance of most neutron detectors is well below that of theoretical limits. An example of this is the neutron detectors used in radiation portal monitors. Ideally, one would want to detect 100% of the neutrons emitted by a neutron source present in the object being scanned (e.g. a vehicle or cargo container) as this would maximize the likelihood of the portal monitor determining that the source was present. For neutron detection, most portal monitors use a neutron detector that consists of one or more $^3$He proportional counters embedded in a blanket of neutron moderator (e.g. high-density polyethylene, or HDPE). For most current systems, a fast neutron (e.g. energy between 100 keV and 20 MeV) entering the surface of the device orthogonally has a probability of being captured and detected in the $^3$He counter of between 15 and 20%. Not only would one want to know whether or not a source is present, ideally one would also like to know what type of source it is (e.g. potentially threatening or not), how big it is, where it is, etc.

Substantial effort has been expended over many years in the pursuit of improved neutron detectors and many different detection methods have been investigated. Although current devices are far more sophisticated and have much better performance than their predecessors of several decades ago, it is universally recognized that a need exists for even better detectors that approach the theoretical limits dictated by the underlying physics. An ideal neutron detector would be able to perform a number of functions, including neutron detection with maximal sensitivity or efficiency (i.e. the probability that a neutron entering the detector is successfully detected), high-resolution neutron energy spectroscopy capabilities, and the ability to determine the direction of an incoming neutron. Of equal importance, these functions would not compete with each other; instead, the detector would be able to perform these functions simultaneously, in contrast to many existing devices in which maximizing one capability requires minimizing another.

Techniques for determining neutron direction.

Several disclosures describe fast (e.g. energy >100 keV) neutron detectors with directional sensitivity. Penn in U.S. Pat. No. 6,989,541 and Byrd in U.S. Pat. No. 5,345,084 describe devices based on multiple sensing elements stacked next to each other. The Penn device is capture-gated, meaning that when a fast neutron is detected via proton recoil (hydrogen scattering), it must then be captured in a reaction with $^3$He in order for it be registered. The Byrd '084 device does not include capture-gating. Both the Penn and Byrd devices can produce an estimate of the radial/azimuthal angle of neutron travel but do not produce a polar angle, precluding an estimate of source location in three-dimensional space. Miller in U.S. Pat. No. 5,880,469 discloses an array of scintillating plastic fibers for fast neutron detection. Directional sensitivity is obtained by physically pointing the device in different directions (the device is elongated); when the device is pointed towards or away from a fast neutron source, it produces a higher neutron count rate than when it is pointed perpendicularly to it. Schulte in U.S. Pat. Nos. 5,036,202 and 5,029,262 discloses a bidirectional fast neutron detector that employs a layer of hydrogenous material located adjacently to multiple layers of thin silicon semiconductor for sensing recoil protons, with a repeated structure of the basic detector (hydrogenous material and silicon semiconductor) used to obtain higher neutron detection efficiency, as the detection efficiency of a single instance of the structure is quite low due to the mean free path of the fast neutrons being large compared to the range of the recoil protons in the device. The Schulte device includes segmentation of the silicon semiconductor into thin slices, enabling the device to determine which direction the proton was traveling across the silicon semiconductor (left-to-right or right-to-left), which is indicative of the direction of travel of the incident neutron. The Schulte device is bidirectional and does not provide a directional estimate in three-dimensional space.

Schulte discloses in U.S. Pat. No. 5,659,177 a thermal neutron detector with directional capability based on Gd foils for thermal neutron capture (leading to electron emission) placed next to segmented silicon semiconductor detectors. Multiple layers are used so that the layer closest to a neutron source will produce a higher neutron count rate than one further away from it, due to the further layer being shielded by the closer layer. Schulte describes how the use of multiple sets of panels pointed in different directions can provide full directional coverage.

Microchannel plates (MCPs) and their derivatives are used for radiation detection, including neutron detection. MCPs have been used for directional neutron detection by employing them as collimators to selectively pass neutrons arriving from a narrow range of angular direction and shield neutrons coming from other directions. (See A. S. Tremsin et al, "Very compact high performance microchannel plate thermal neutron collimators," IEEE Transactions on Nuclear Science vol. 51, no. 3, pp. 1020-1024, 2004.) Although this approach does yield high confidence in the direction of travel of a neutron, it does so primarily for low energy neutrons (e.g. cold and approximately thermal neutrons) and results in most neutrons coming from a direction other than from a narrow angular range being lost completely to the detector rather than being differentiated on the basis of their direction of travel. As most security-related neutron detection applications require detecting only a small increase in neutron fluence through a detector, maximizing neutron detection efficiency is quite important and a high loss rate of neutrons reaching the detector to fates other than detection is undesirable.

Techniques related to neutron energy spectroscopy.

Kronenberg et al. disclose a neutron spectrometer for spectroscopy of neutrons between 1 and 250 MeV. (U.S. Pat. Nos. include 6,349,124; 6,594,332; 6,614,867; 6,625,243; 6,654,434; 6,654,435; 6,678,343; 6,714,616; 6,717,999; 6,765,978; 6,928,130; and 6,954,512.) These patents are based on the concept of a dodecahedron-shaped device that includes polyethylene for fast neutron-to-proton conversion (via hydrogen scattering), absorbers of different thicknesses for reducing proton energies by specific amounts, and detectors (semiconductors are specified in most patents) for detecting the protons and determining their energies. The different patents represent a variety of different variations on this basic concept.

Fehrenbacher et al. in U.S. Pat. No. 6,423,972 disclose a neutron spectrometer based on semiconductor detectors, with a multiplicity of individual detectors consisting of converter layers coupled to semiconductor active detection layers, with the converter and active layers separated by inactive layers. Converter layers proposed include Li, B, N, and H-bearing materials. A neural network is proposed for processing signals from the individual detectors. Fehrenbacher et al are concerned primarily with the details of the semiconductor detectors and signal analysis and do not propose the use of neutron moderator in their system, either as a means of enhancing neutron detection efficiency or as part of a method of obtaining neutron spectral information.

Buchanan in U.S. Pat. No. 5,204,527 discloses a neutron spectrometer based on lithium tantalate. When a neutron is captured by a $^6$Li atom in the lithium tantalate, measurement of the total energy deposition in the lithium tantalate enables the energy of the neutron to be determined by subtracting the Q value (4.78 MeV) of the $^6$Li capture reaction. A neutron energy spectrum is then constructed using the data from a number of neutron events.

Brooks et al provide a useful overview of neutron spectroscopy (spectrometry) in their review paper [F. D. Brooks and H. Klein, "Neutron spectrometry—historical review and present status," Nuclear Instruments and Methods in Physics Research A 476, pp. 1-11, 2002.] That article summarizes the different types of neutron spectrometers that have been described in the literature.

An article by Toyokawa et al. describes a neutron detector whose design is derived from the Bonner Sphere (Bonner Ball) neutron spectrometer concept [H. Toyokawa et al, "A spherical neutron counter with an extended energy response for dosimetry," Radiation Protection Dosimetry 70, pp. 365-370, 1997]. In the Toyokawa device, three position-sensitive cylindrical $^3$He proportional neutron counters are placed at right angles (i.e. one each in the x, y, and z directions) inside a sphere of neutron moderator. This concept improves over the classic Bonner Sphere concept by removing the requirement that a series of different measurements be made, with a different thickness of removable moderating outer shell being used around the sphere for each measurement. Yamaguchi et al describe a very similar device in which lithiated glass scintillating optical fibers are used in lieu of the $^3$He proportional counters for neutron detection [S. Yamaguchi et al, "Spherical neutron detector for space neutron measurement," Nuclear Instruments and Methods in Physics Research A 422, pp. 600-605, 1999].

R. A. Craig and M. Bliss disclose a neutron spectrometer consisting of a series of layers of lithiated glass fibers for neutron detection sandwiched between layers of hydrogenous neutron moderator, the various layers of fiber having different response functions to neutrons as a function of neutron energy [R. A. Craig and M. Bliss, "Performance of moderating neutron spectrometers that use scintillating fibers," Transactions of the American Nuclear Society, 83, pp. 258-259, 2000). In U.S. Pat. No. 6,707,047 they disclose a device based on this concept for measuring the hydrogen content of a material using neutron spectroscopy, with the material being placed within a receptacle formed with a container made of neutron moderator in which the lithiated glass fibers are embedded.

Bubble Technology Industries (BTI) of Chalk River, Ontario, Canada, has produced several devices specifically for neutron spectroscopy. The ROSPEC (Rotating Neutron Spectrometer) device consists of six neutron detectors of various design, such that the response function (as a function of neutron energy) is different for each detector. The six detectors are mounted on a rotating circular platform that rotates while a measurement is being taken in order to eliminate any geometric effects that may skew the data due to a detector having a non-uniform directional response. Each of the six detectors is contained within its own housing that is physically distinct from other detectors and their housing (in other words, there is a gap or separation between adjacent detector housings). BTI also manufactures several other devices for neutron spectroscopy such as liquid scintillator-based devices and $^3$He proportional counters with enhanced efficiency at higher neutron energies (e.g. fast energy).

Techniques related to determining both neutron energy and direction.

Martoff in US Patent Application 2006/0017000 discloses a gas chamber equipped with a series of anodes and electrodes and in which the gas (e.g. $^3$He) is reactive with low energy neutrons. The device is intended to produce a series of signals from the anodes and electrodes that indicate the energy and direction (and therefore the momentum) of the neutron reaction products (e.g. $^3$H and a proton from $^3$He neutron capture). This information is intended to be used to calculate the momentum of the neutron immediately prior to the neutron capture reaction, thereby indicating its energy and direction.

Techniques related to limiting neutron sensitivity to fast neutrons and determining neutron direction.

August in U.S. Pat. No. 5,078,951 discloses the concept of using fissionable materials that can only undergo fission as the result of fast neutron capture and using them as the neutron-sensitive (neutron-reactive) material in a neutron detector, thereby making the detector sensitive to fast neutrons only. August '951 further discloses the ideas of using an array of such detectors, employing a thermal neutron shield around the device to reduce background noise, and obtaining directional sensitivity using the difference in neutron count rate with spatial location in a large array. The disclosed device does not yield spectroscopic information, only a measurement of fast neutrons.

Techniques related to optimizing detector geometry to maximize neutron detection efficiency.

Polichar et al. in US Patent Application 2005/0224719 disclose the concept of a composite neutron scintillator based on sandwiching multiple layers of neutron scintillator between layers of hydrogenous neutron moderator in order to achieve higher neutron detection efficiency than non-layered systems, such as a $^3$He tube surrounded by a blanket of neutron moderator. The entire composite scintillator is treated as a single sensing unit; there is no discretization or other segmentation of the composite scintillator into individual sensing units.

The concept of a neutron converter layer sandwiched between two semiconductor detectors has been around for some years. McGregor et al. in US Patent Application 2005/0258372 disclose a device based on a modification of this concept in which grooved surfaces are used to increase the effective area of converter layer per unit area of semiconductor.

Odom et al. in U.S. Pat. No. 6,495,837 disclose a neutron scintillator consisting of alternating cylindrical layers of optically transparent neutron moderator and a scintillating material for use in fast neutron detection. Odom et al also identify that the detector has some directional sensitivity in the sense that neutrons traveling down its length are more likely to be detected than neutrons traveling across it, but not in the sense of being able to estimate neutron or source direction in three-dimensional space. In U.S. Pat. No. 6,566,657, Odom et al further disclose a device that in part builds on '837. The device consists of alternating layers of scintillating material and optically transparent hydrogenous neutron moderator material, with the layers "dimensioned to optimize spectroscopic detection efficiency." However, it is clear that the device described does not actually produce an estimate of the neutron energy spectrum, but instead is "spectroscopic" only in the sense that it detects neutrons between 0.5 and 14 MeV and does not detect neutrons of lesser energy. In U.S. Pat. No. 6,639,210, Odom et al. disclose a device for borehole/well logging that represents the application of their previous patents to this purpose.

Perkins et al. in U.S. Pat. No. 5,680,423 disclose a method for drawing glass scintillating glass fibers for use in neutron detection. They disclose the concept of dispersing the scintillating fibers throughout a block of neutron moderating material in order to maximize the fast neutron detection efficiency of a device based on such fibers.

Hutchinson et al. disclose a combined neutron/gamma detector with enhanced detection efficiency for homeland security applications. (D. P. Hutchinson, R. K. Richards, A. C. Stephan, "Large Area Combined Neutron/Gamma Detector for Homeland Security," presented at Detector/Sensor Research and Technology for Homeland and National Security: Chemical, Biological, Nuclear and Radiological Weapons, and Toxic Industrial Chemicals, Sep. 14-16, 2004, Gatlinburg, Tenn.) The proposed device is based on two layers of neutron scintillator screen (each layer is read independently of the other) sandwiched between neutron moderator and plastic scintillator for neutron moderation and gamma detection. Hutchinson et al. demonstrate that using two layers of scintillator screen substantially enhances neutron detection efficiency compared to a device using only one screen (32% versus 18% for Pu spontaneous fission neutrons). Hutchinson et al. do not disclose any directional or spectroscopic neutron capability.

Antech, Inc. sells the Model 2442 Active Well Coincidence Counter (AWCC). (This instrument was formerly known as the JOMAR 51 and was sold by Jomar Systems, Inc.) The Model 2442 is used for measuring the uranium and plutonium content of samples (e.g. waste drums). Geometrically it is a hollow cylinder with thick walls, the interior cavity being used to hold the sample being assayed. The walls comprise polyethylene neutron moderator in which forty two $^3$He tubes (proportional neutron counters) are distributed, being divided into two rings. This spatial distribution of the $^3$He tubes is used to achieve high neutron detection efficiency (typically around 31%). Additionally, the system is designed to count coincident neutron detection events in different $^3$He tubes; these events usually indicate fission events in the sample being measured (many fission events release multiple neutrons). As designed and operated, the Model 2442 does not provide information about neutron direction (neutrons are assumed to originate in the sample being measured, which is located inside the cavity in the device) or neutron energy. Calculations performed at Oak Ridge National Laboratory used a Monte Carlo code for simulating AWCCs; simulations of the Model 2442 are described in the ORNL report, S. A. Pozzi, R. B. Oberer, and L. G. Chiang, "Monte Carlo simulation of measurements with an active well coincidence counter."

Techniques related to neutron detectors consisting of arrays of sensing elements.

In US Patent Application 2005/0094758, Ronaldson et al. disclose a method of monitoring a sample containing a neutron source for spontaneous fission neutrons, including coincident neutrons, in order to estimate the mass of the neutron source material. The device contemplated by Ronaldson is approximately cylindrical with a hollow interior for receiving a sample. The walls of the device are contemplated to include a layer of hydrogenous neutron moderator in which a series of neutron detectors (e.g. $^3$He proportional counters) are placed.

Devices based on scintillating fibers are known in the art. Disdier et al in US Patent Application 2005/0161611 disclose a neutron detector consisting of an array of neutron-detecting fibers, each fiber being comprised of a hollow glass tube filled with liquid scintillator. A plurality of such fibers are formed into a device for detecting fast neutrons via proton recoil in the liquid scintillator. Disdier et al suggest the fibers could be used with coded apertures for imaging. Tarabrine in US Patent Application 2004/0227098 discloses a neutron detector consisting of layers of hydrogenous scintillating fibers, with each layer at right angles to the previous layer. The device is intended to detect fast neutrons via proton recoil.

Devices based on semiconductor neutron detectors are also known in the art. Albrecht et al. in U.S. Pat. No. 5,281,822 disclose a fast neutron detector based on a large array of PIN diodes, with neutrons interacting directly in the PIN diodes to produce a signal. The device is able to distinguish between fast neutrons above 8.5 MeV (or other selected energy level) and lower energy neutrons. Seidel et al. in U.S. Pat. No. 5,940,460 disclose an array of semiconductor neutron detectors intended for use in a nuclear reactor for monitoring neutron flux across the range from startup to full-power. In the description and examples given, the semiconductor detectors consist of a semiconductor placed adjacently to a converter layer (e.g. LiF) that produces energetic charged particles as a result of neutron interactions. Seidel et al. disclose that by using multiple types of converter materials that have different characteristic changes in responsiveness to neutron energy, some spectroscopic information can be obtained. Carron et al. in U.S. Pat. No. 5,399,863 disclose a thermal neutron detector consisting of stacked CCD arrays with thin boron slabs between them for producing charged particle neutron reaction products that exit the boron and enter the CCD elements, producing pulses. Carron et al. also disclose that discrimination against gamma rays may be performed by rejecting coincident events in adjacent CCD elements, including adjacent elements between stacked CCD arrays.

In US Patent Application 2006/0023828, McGregor et al. disclose an array of micro neutron detectors, each array comprising one or more of the following: (1) a first gas pocket in contact with a neutron reactive material and a second gas pocket in contact with a different neutron reactive material; (2) a plurality of gas pockets and at least two neutron reactive materials different from one another in contact with the gas; (3) a triad of gas pockets, two of the pockets having neutron reactive materials in contact with the gas and one of the pockets having no neutron reactive material in contact with the gas; and (4) two substrates attached to one another to form a plurality of capillary channels capable of retaining a gas and a neutron reactive material in one of the two substrates oriented into the capillary channels. McGregor et al contemplate a layer of neutron reactive material (e.g. $^{10}$B, $^6$Li, $^{235}$U) placed adjacent to a gas in which ionizations are produced when an energetic reaction product from a neutron interaction exits the neutron reactive material and enters the gas, with the motion of the ionizations through the gas producing a current that is sensed by nearby electrodes. The use of different neutron reactive materials provides some ability to estimate neutron energy spectrum, such as by using a material that is preferably sensitive to thermal neutrons in one detector and a different material that is preferably sensitive to fast neutrons in another detector. McGregor et al. also contemplate obtaining a rough estimate of neutron energy by placing different thicknesses of moderator over different sections of a detector. Some directional response is also expected; McGregor et al. state that neutrons incident on the front face of the detector are generally more likely to be detected than neutrons entering from the side due to the thickness of the detector. McGregor et al. contemplate enhancing directional sensitivity by placing selectively chosen collimator holes in the detector. While McGregor et al. focus on the use of the device for reactor core neutron flux mapping, they also disclose that the device may be used for neutron imaging in scientific research and detection of nuclear weapons and nuclear weapons-usable material. In US Patent Application 2006/0043308, McGregor et al. disclose a method for fabricating the neutron detectors disclosed in US Patent Application 2006/0023828, and in US Patent Application 2006/0056573, McGregor et al. disclose methods for using the neutron detectors for monitoring nuclear reactor core neutron flux, as was contemplated as a use of the neutron detectors disclosed in US Patent Application 2006/0023828.

Sarantites et al. disclose a neutron detector consisting of an array of hexagonal sensors placed side-by-side to form a partial sphere for detecting neutrons traveling away from the center of the sphere [D. G. Sarantites et al., "'Neutron shell': a high efficiency array of neutron detectors for γ-ray spectroscopic studies with Gammasphere," Nuclear Instruments and Methods in Physics Research A 530, pp. 473-492, 2004].

Techniques related to directional detection of radiation and radiation sources generally and are not specific to neutrons.

Chuiton et al. in U.S. Pat. No. 5,073,715 disclose a directional radiation detector consisting of six radiation sensors located at 90 degrees to one another inside a homogeneous sphere and near its surface. The direction to the source is estimated based on the comparative count rates of the six sensors. Chuiton et al. suggest that the best approach is to have all sensors at the same radial distance from the center of the sphere. McGregor et al. in U.S. Pat. No. 6,806,474 disclose a directional radiation detector consisting of a detector that is shielded from radiation across a range of polar angles and unshielded across another range of polar angles. McGregor et al. propose using a set of movable louvers/collimators to change the shielded and unshielded angles, allowing the device to measure the dependency of incident radiation on the direction of radiation travel. Gottesman et al in U.S. Pat. No. 5,036,546 disclose the concept of using a coded aperture array for radiation imaging. The coded aperture consists of a planar-shaped shield with windows in it through which radiation can enter without being shielded. When used in conjunction with a position-sensitive radiation detector, the detector response pattern can be deconvoluted to produce an image of the radiation source. In U.S. Pat. No. 6,528,797, Benke et al. disclose a system for determining the depth distribution of radioactive material located within a source medium (e.g. soil) using a device that is sensitive to radiation emitted within selected ranges of polar angles relative to a detector axis which is substantially perpendicular to an outer surface of a source medium. In U.S. Pat. No. 6,727,505, Benke et al. disclose another system for determining the depth distribution of radioactive material located within a source medium (e.g. soil), the system consisting of at least one central detector; a plurality of separate satellite detectors adjacent to and surrounding the central detector(s), each of the satellite detectors having a different field of view than the other satellite detectors; a plurality of radiation shields, with a radiation shield situated between each pair of adjacent satellite detectors to substantially block ionizing radiation originating outside the field of view of each satellite radiation detector, in which the signals from the central and satellite detectors represent a spectral footprint of an area and spatial distribution of a radiation source within the area.

Bross et al., in U.S. Pat. No. 6,909,098 disclose radiation scintillators used with wavelength-shifting (WLS) fibers for readout. They mention that nano-sized particles can be used to dope atoms that interact strongly with neutrons into a plastic scintillator to give the scintillator neutron sensitivity. The patent teaches how to combine the scintillator with the WLS fibers and how to analyze the data from the neutron scintillator and another type of scintillator to determine the amount of signal coming from neutrons and the amount from other sources that are not of interest.

Grodzins, et al. in U.S. Pat. App. Pub. 2003/0165211 disclose detecting thermal (low energy) neutrons using a scintillator. The specific method for yielding the claimed directionality is not clearly described, although it does apparently stem from the angle between the neutron capture event location and the line of axis through the photomultiplier tube (PMT).

Objects and Advantages

Objects of the present invention include the following: providing a more efficient neutron detector; providing a neutron detector that makes more efficient use of moderator materials; providing a radiation detector with improved discrimination capabilities; providing a neutron detector capable of obtaining information about the energy spectrum of neutrons it detects; providing a neutron detector capable of determining the isotope(s) from which neutrons have been detected, even when significant shielding is present that modifies the energy spectrum of the neutrons that reach the detector from the source; and providing directional information about neutrons reaching the detector. These and other objects and advantages of the invention will become apparent from consideration of the following specification, read in conjunction with the drawings.

SUMMARY OF THE INVENTION

According to one aspect of the invention, an apparatus for detecting neutrons comprises: a volume of neutron moderating material; and two pairs of independently readable neutron detecting elements disposed within the moderator volume, the first of the pairs being equidistant from a selected outside surface of the moderator and separated from the selected outside surface of the moderator by no more than 2 g/cm$^2$ areal density of the moderating material, and the second of the pairs being equidistant from a selected outside surface of the moderator and separated from the selected outside surface of the moderator by a greater density of moderating material than separates the first pair from the first selected surface.

According to another aspect of the invention, an apparatus for detecting neutrons comprises: a volume of neutron moderating material; and at least four independently readable neutron detecting elements disposed within the moderator volume, the four elements arranged to form three individually addressable pairs defining three non-parallel directions, wherein each of the three pairs is characterized by the property that each of the two respective detecting elements forming the pair return substantially equivalent neutron detection results when the apparatus is exposed to a neutron flux coming from one direction and the two detecting elements return substantially different neutron detection results when a neutron flux is applied from another direction.

According to another aspect of the invention, a method for detecting neutrons comprises the steps of:

a. forming a volume of neutron moderating material having a selected size and shape; and, b. measuring the thermal neutron flux in at least two pairs of locations within the volume, the first of the pairs being equidistant from a selected outside surface of the moderator and separated from the surface of the moderator by no more than 2 g/cm$^2$ areal density of the moderating material, and the second of the pairs being equidistant from a selected outside surface of the moderator and separated from the outside surface of the moderator by a greater density of moderating material than separates the first pair from the outside surface.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

BRIEF DESCRIPTION OF THE DRAWINGS

Figure 1A:
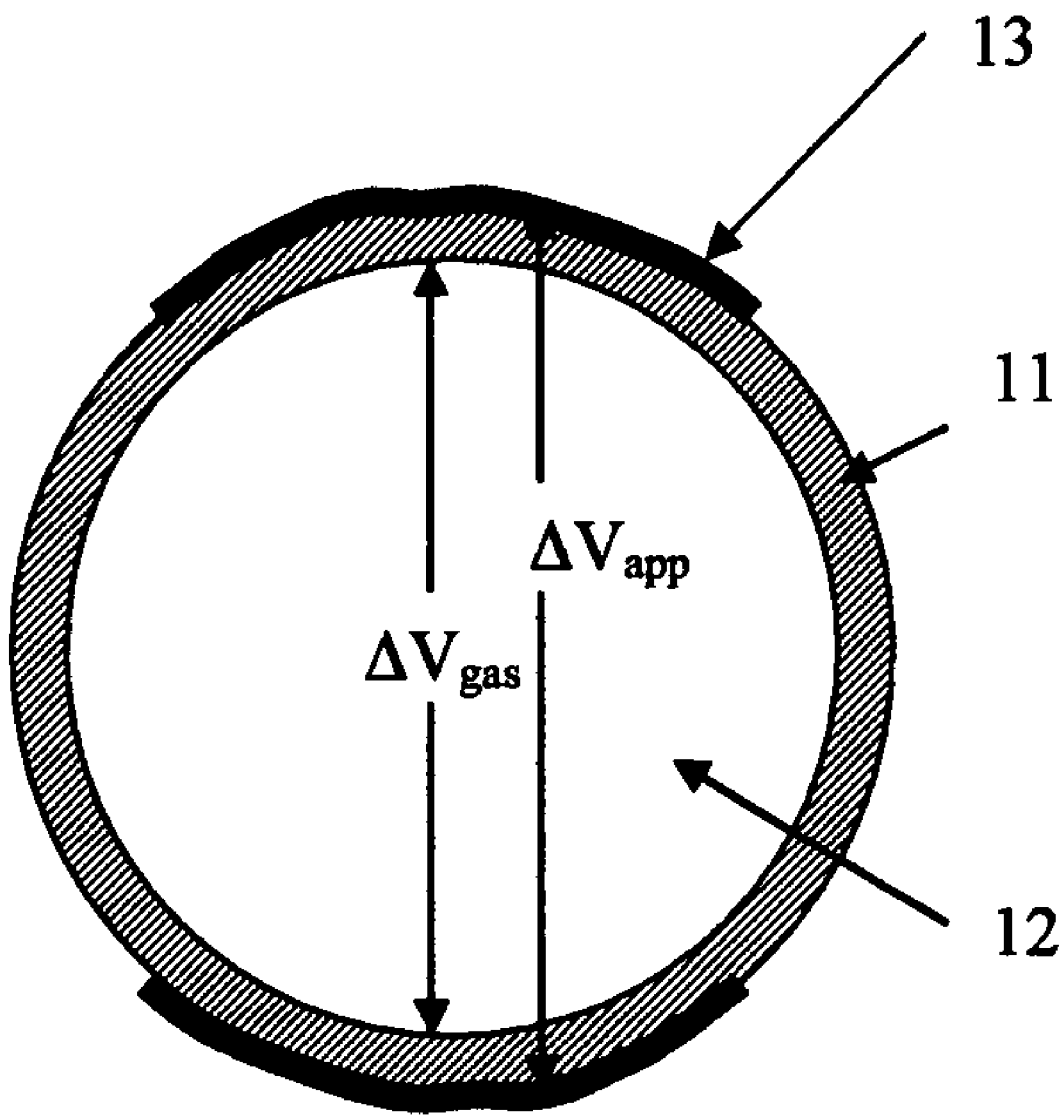

FIG. 1A is a schematic diagram in cross-section of a single balloon with external electrodes, showing voltage drops across the different components.

Figure 1B:
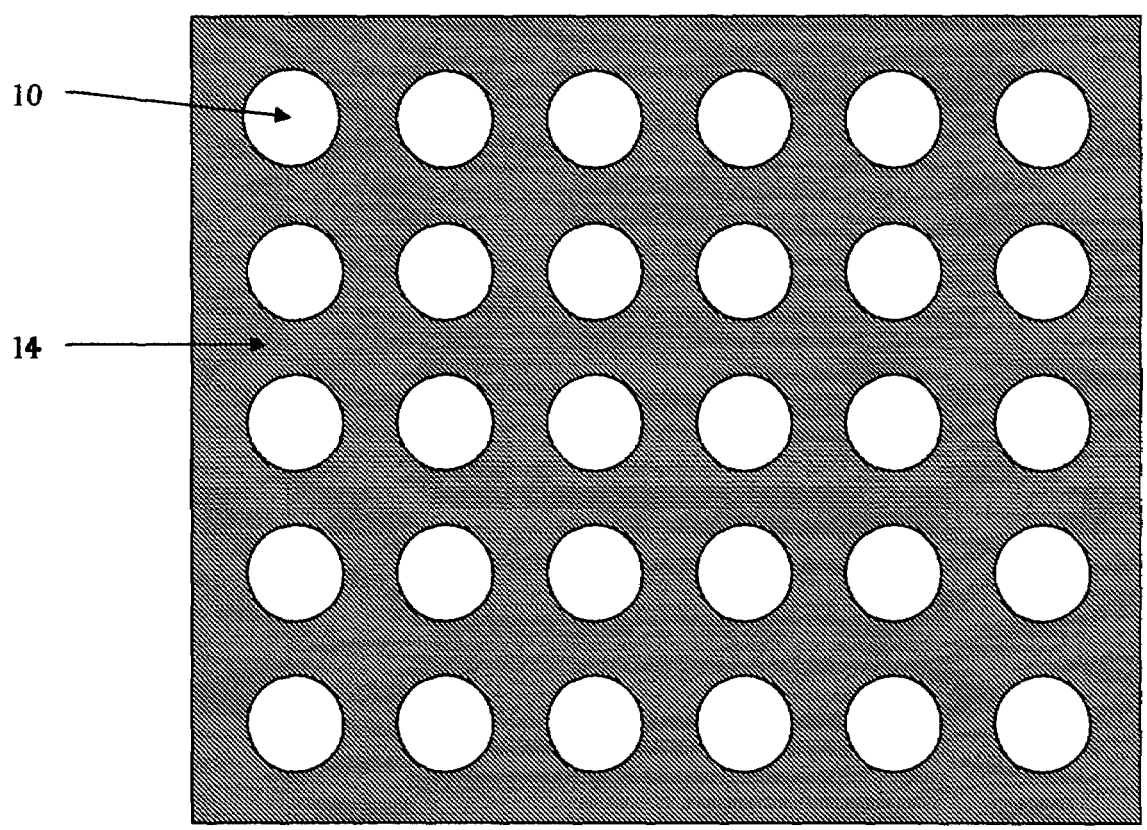

FIG. 1B is a schematic diagram in cross-section of a configuration of gas-filled dielectric balloons dispersed in a matrix of neutron moderator.

Figure 2:
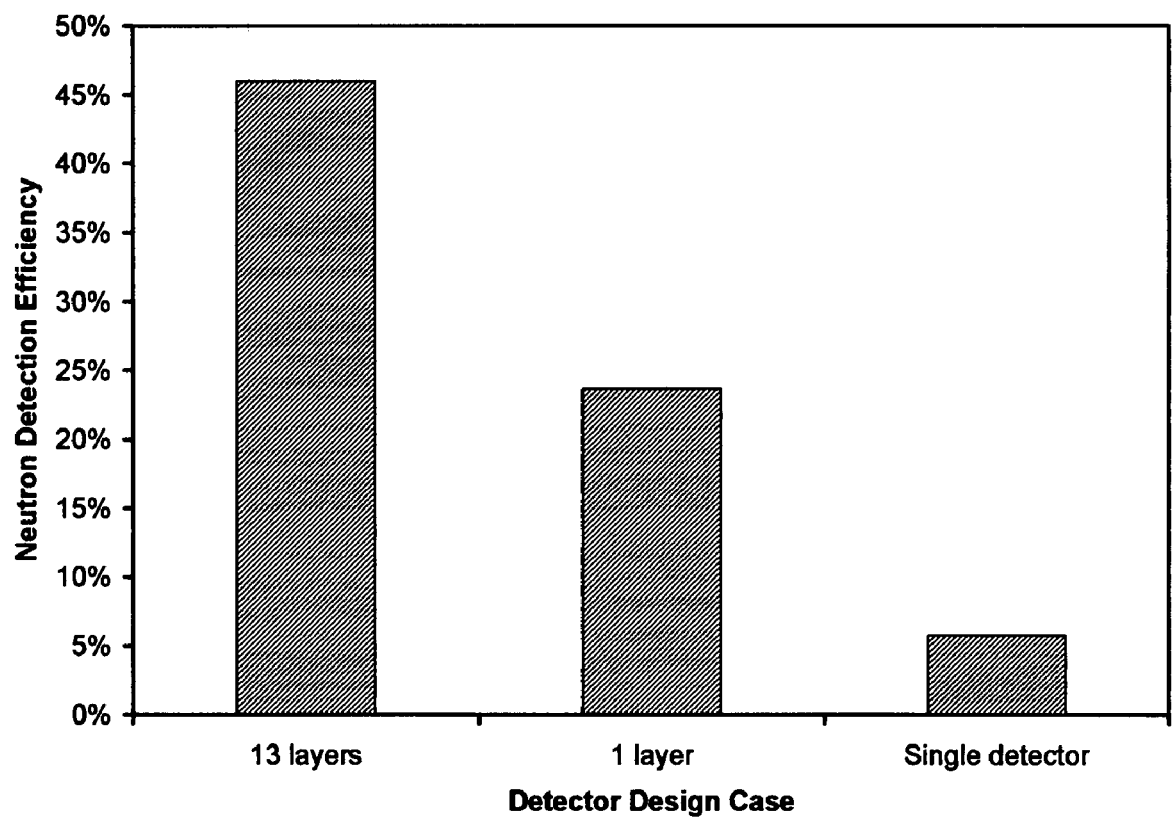

FIG. 2 is a plot of the detection efficiency for neutrons emitted by Pu spontaneous fission for three different detector design configurations, each configuration employing the same quantity of neutron capture material.

Figure 3:
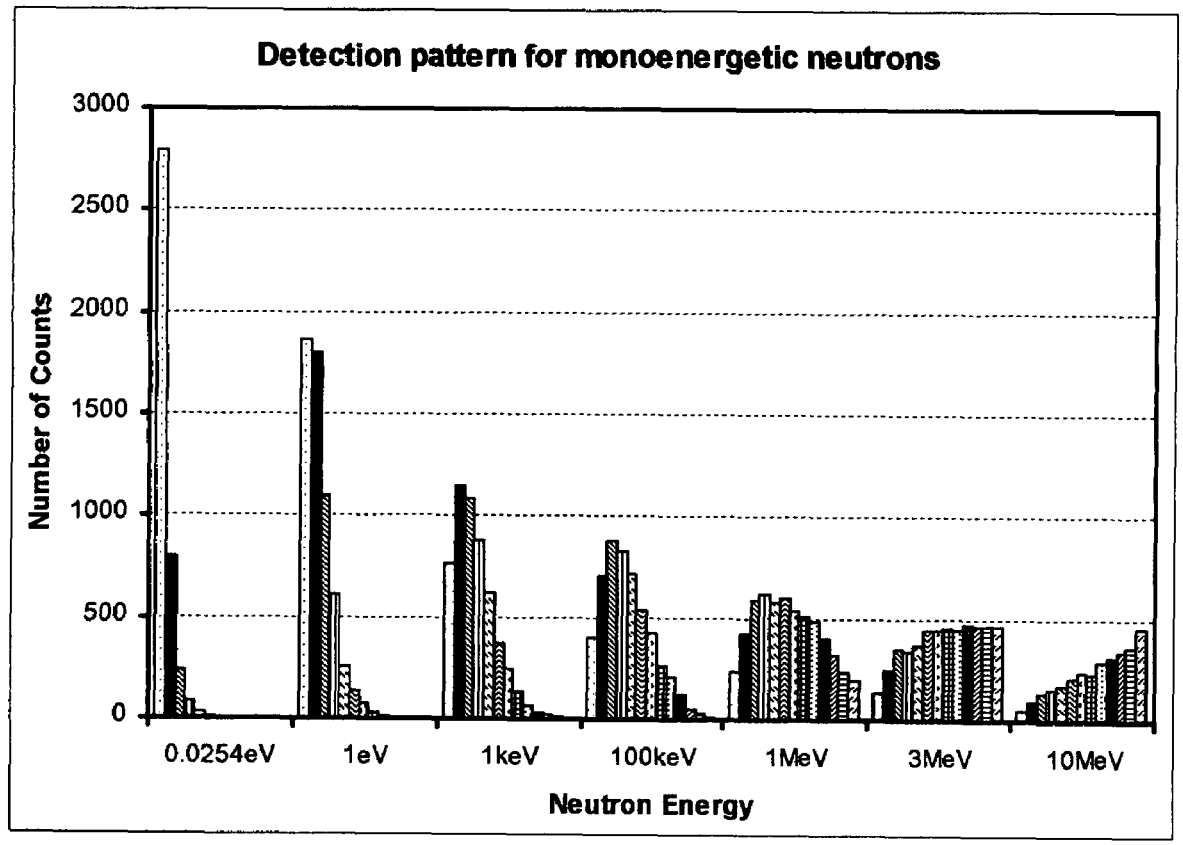

FIG. 3 is a plot of the one-dimensional spatial distribution of neutron detection events inside a configuration consisting of 13 layers of gas-filled dielectric balloons dispersed in a matrix of neutron moderator for neutrons of various energies or energy distributions.

Figure 4:
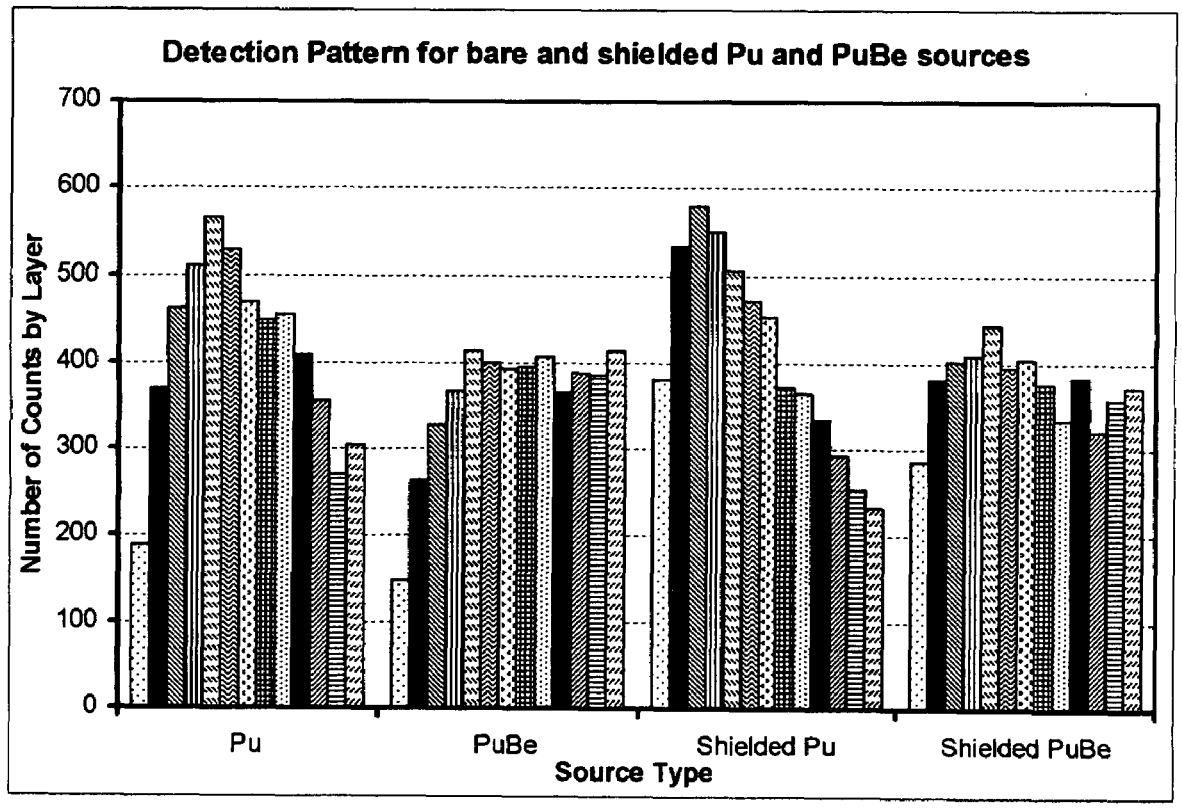

FIG. 4 is a plot of the one-dimensional spatial distribution of neutron detection events inside a configuration consisting of 13 layers of gas-filled dielectric balloons dispersed in a matrix of neutron moderator for Pu spontaneous fission neutrons and moderately shielded Pu spontaneous fission neutrons.

Figure 5:
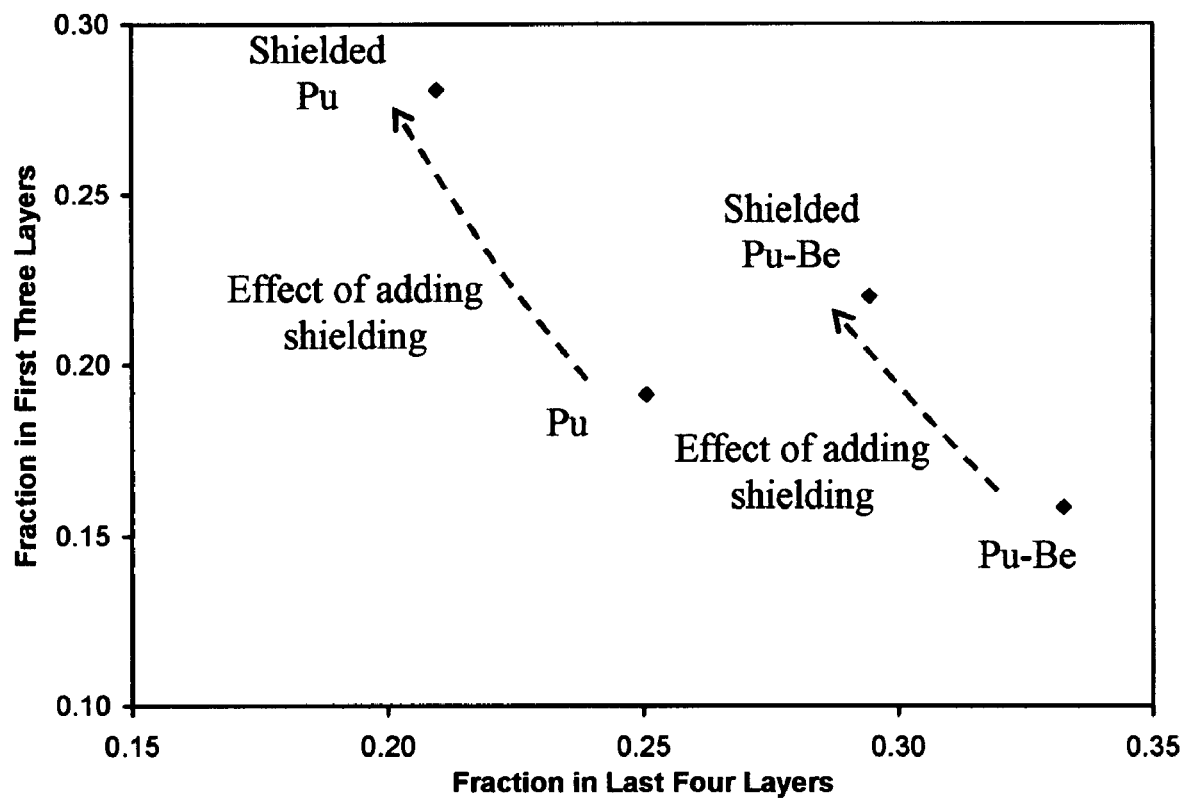

FIG. 5 is a plot of parameters derived from the one-dimensional spatial distribution of neutron detection events inside the same configuration as that used for FIG. 4, showing the parameter values for bare and moderately shielded Pu and Pu—Be sources.

Figure 6:
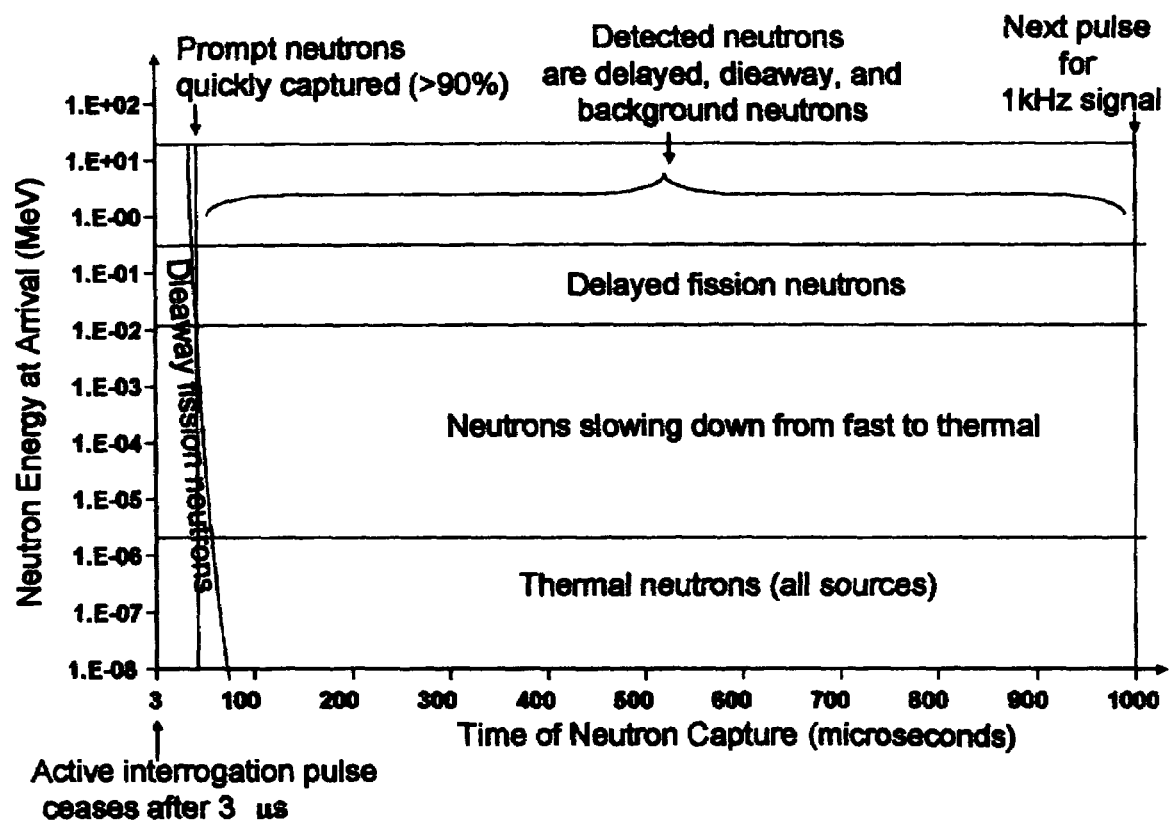

FIG. 6 is a schematic showing the approximate distribution of neutrons in time and energy as they arrive at a neutron detector in an active interrogation system.

Figure 7A:
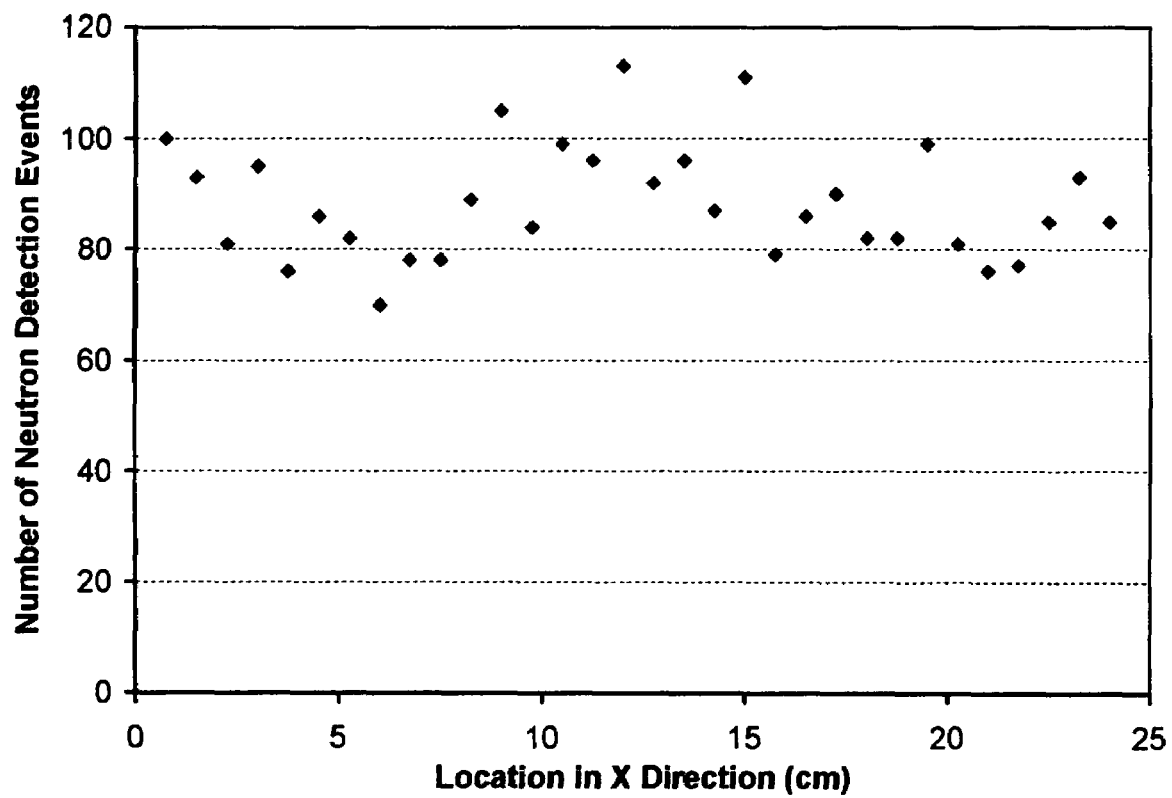

FIG. 7A is a plot of the spatial distribution of neutron detection events in the x direction for a portable neutron detection system in which Pu neutrons enter from the −z side and travel in the +z direction. Data were obtained from a Monte Carlo calculation.

Figure 7B:
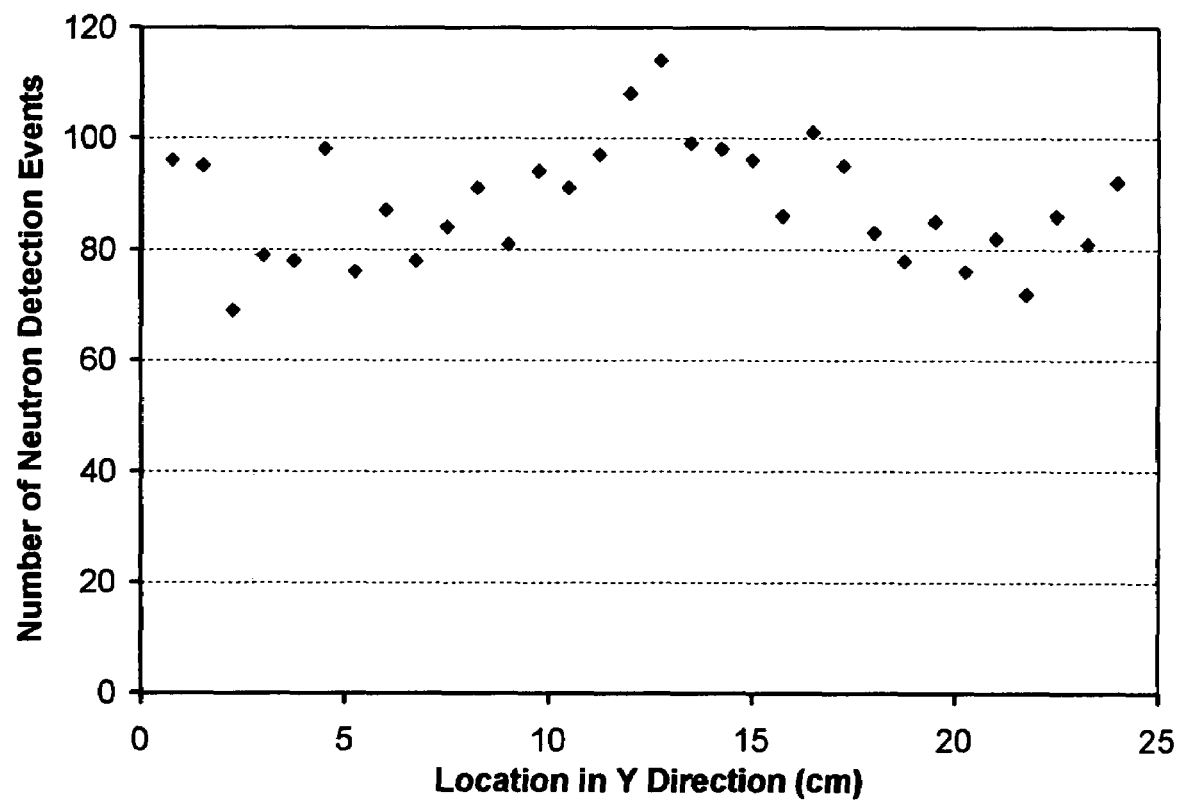

FIG. 7B is a plot of the spatial distribution of neutron detection events in the y direction for a portable neutron detection system in which Pu neutrons enter from the −z side and travel in the +z direction. Data were obtained from a Monte Carlo calculation.

Figure 7C:
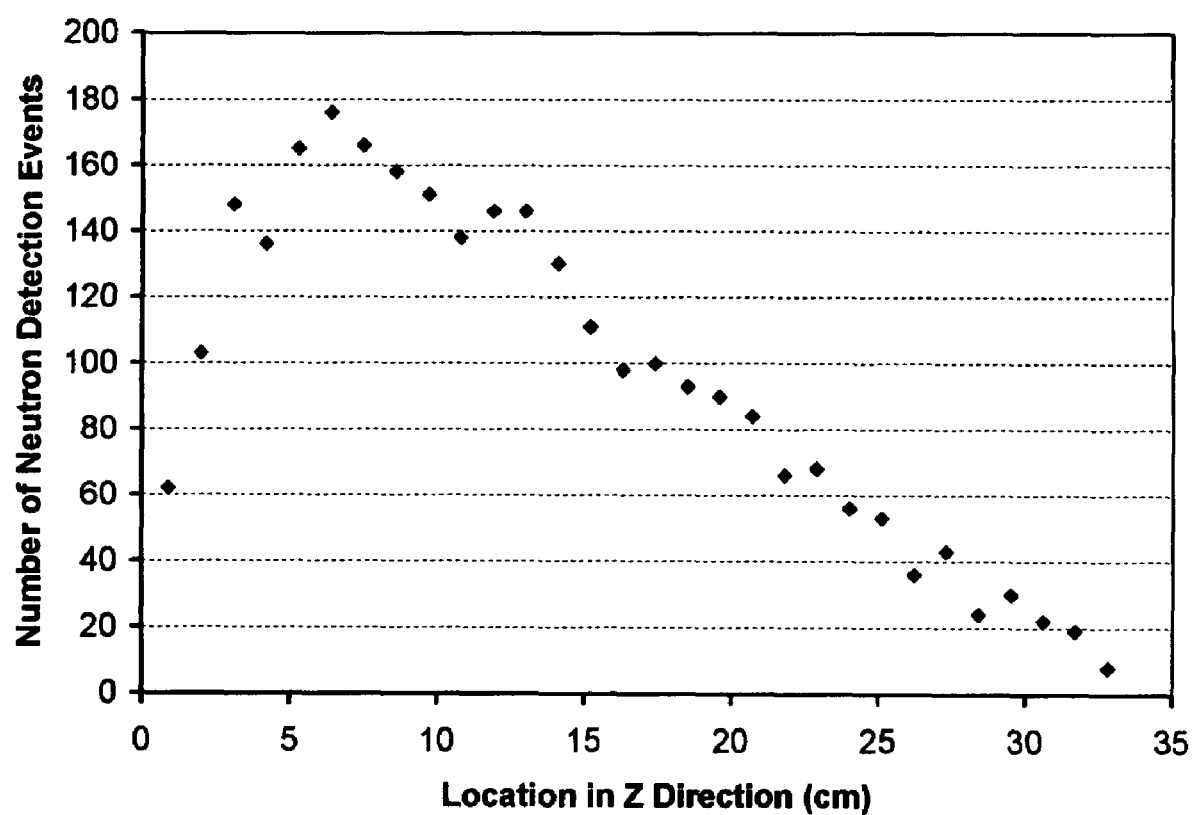

FIG. 7C is a plot of the spatial distribution of neutron detection events in the z direction for a portable neutron detection system in which Pu neutrons enter from the −z side and travel in the +z direction. Data were obtained from a Monte Carlo calculation.

Figure 8A:
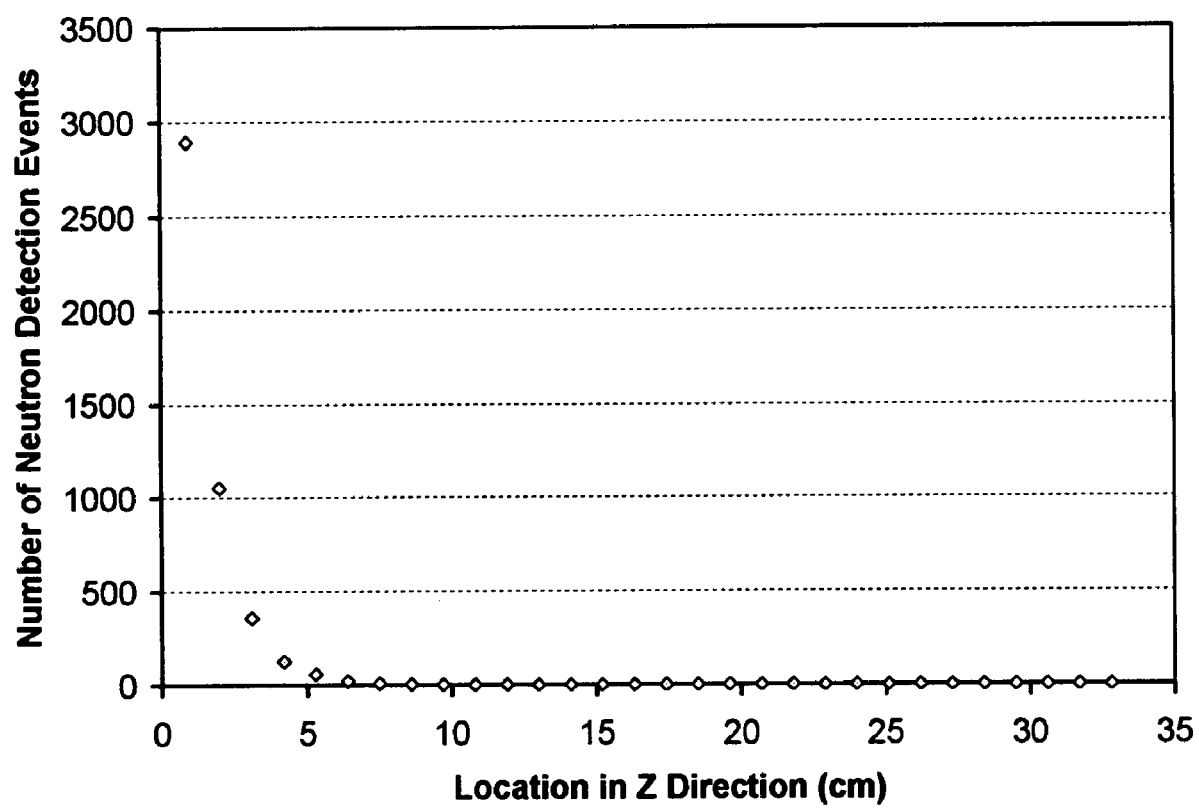

FIG. 8A shows the spatial distribution of neutron detection events in the z direction for thermal neutrons entering the detector from the −z side and traveling in the +z direction, using the neutron detection system from FIG. 7. Data were obtained from a Monte Carlo calculation.

Figure 8B:
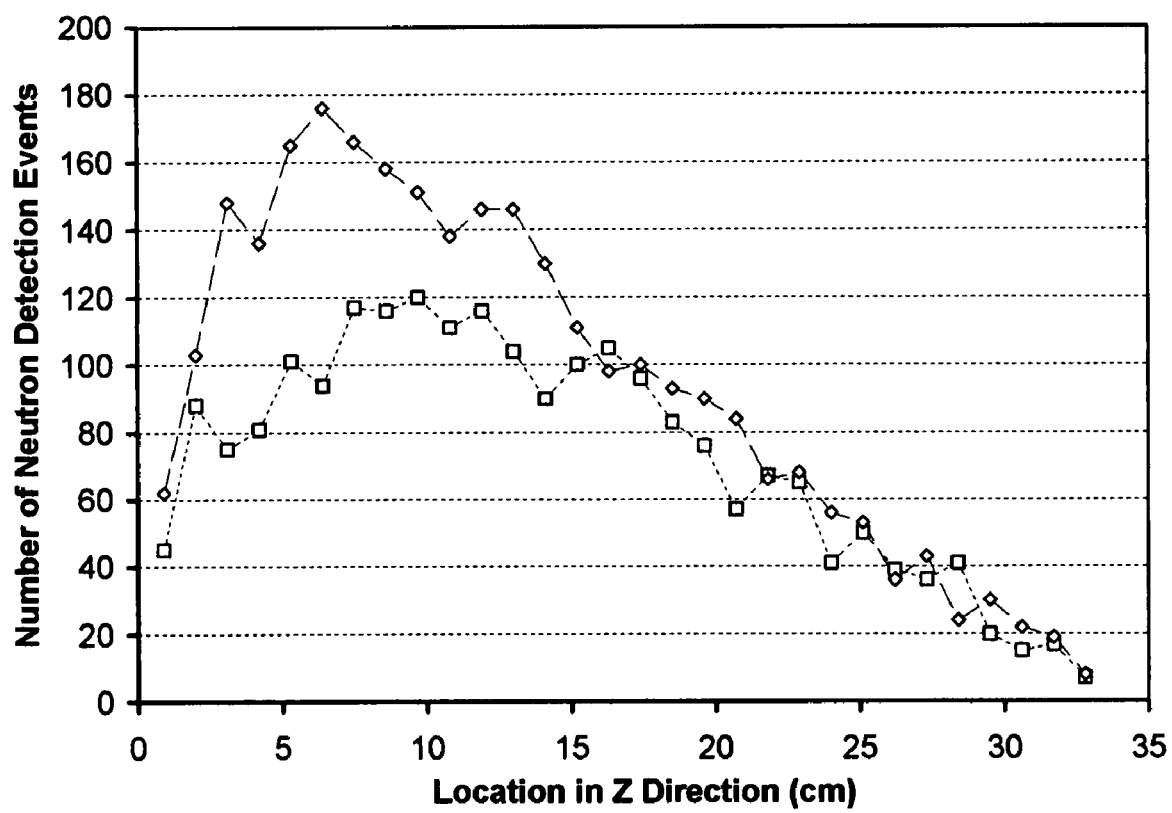

FIG. 8B shows the spatial distribution of neutron detection events in the z direction for neutrons from Pu and Pu—Be entering the detector from the −z side and traveling in the +z direction, using the neutron detection system from FIG. 7. Data were obtained from a Monte Carlo calculation.

Figure 9:
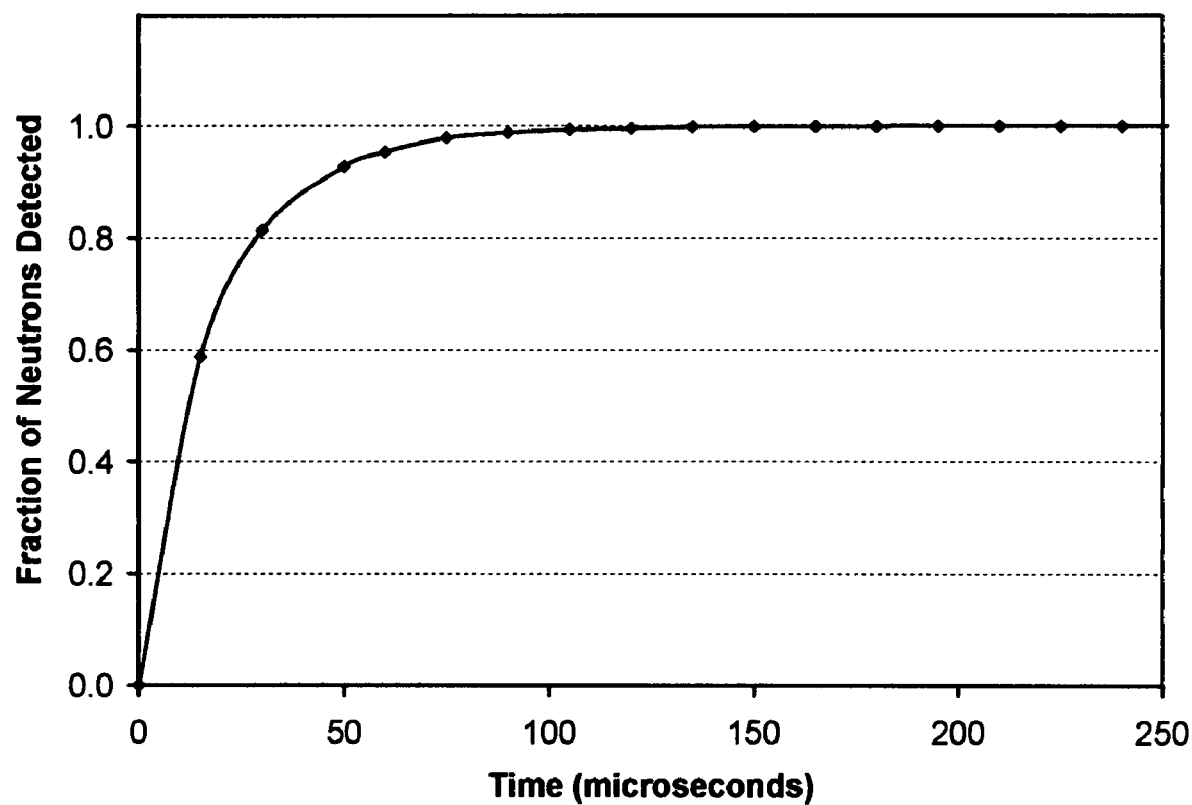

FIG. 9 is a plot of the distribution of time jitter (time between when a neutron enters the detector and when the neutron is captured and detected in a gas-filled dielectric sensor balloon) for the neutron detection system from FIG. 7. Data were obtained from a Monte Carlo calculation.

DETAILED DESCRIPTION OF THE INVENTION

In its most general form, the inventive apparatus comprises a volume of neutron moderating material and a plurality of individual neutron sensing elements dispersed at selected locations throughout the moderator, and particularly arranged so that some of the sensing elements are closer to the surface of the moderator and others are more deeply embedded. Sensing elements are distributed according to principles described in this Application; this enables the obtaining of information regarding neutron energy spectrum and directional distribution. Sensing elements are located on nonparallel axes, causing them to have different responses as a function of neutron direction and energy. Sensing elements closer to the surface of the device are more sensitive to incoming thermal neutrons (preferably less than 2 g/cm$^2$ of areal density of moderator between the sensing elements and the surface, and more preferably less than 1.5 g/cm$^2$), while sensing elements embedded more deeply in the device are more sensitive to incoming higher energy neutrons. In other words, assuming all the sensors are substantially sensitive to thermal neutrons, the sensors close to the surface of the moderator will detect primarily neutrons that were already at thermal energy when they entered the device, whereas more deeply embedded sensors will detect primarily neutrons that entered at higher energy and became thermalized by traveling in the moderator. The preferred neutron detecting elements comprise individually addressable dielectric capsules containing ionizable gas as more fully described in Applicants' co-pending application. As will be shown in the several examples that follow, this arrangement makes more efficient use of the moderator by capturing some thermalized neutrons that might otherwise be scattered away from a single, centrally located detector element. It further allows more detailed neutron energy information to be collected for spectroscopic analysis and estimation of the direction of travel of the detected neutrons and the direction to the neutron source. The dispersion of the neutron detecting elements throughout the moderator according to the principles disclosed herein also has the effect of minimizing time jitter (time delay) between the time at which a neutron enters the apparatus and the time at which the neutron is detected by the neutron detecting elements. This is a very significant advantage when using the device in conjunction with active interrogation and when using data analysis techniques such as fission chain neutron identification in which the time distribution of neutron arrival at the device is very important. Because the device can obtain information regarding neutron energy and directionality simultaneously with a high neutron detection efficiency, and can be further designed to detect neutrons with high time accuracy, data analysis and operating software can be provided that yields much more detailed and useful information than a traditional neutron detector that only yields a raw neutron count rate. For example, the data analysis and operating software can estimate the direction to a neutron source, estimate the type of neutron source (and estimate the size of the source, in some cases), and provide information to the user about whether or not the source is likely to be threatening (e.g. nuclear weapons-usable material or a Pu—Be neutron source for scientific research or industrial radiography).

The invention may be carried out in many different geometrical arrangements that preserve its fundamental characteristics. Some different arrangements may include the overall size and shape of the moderator, the arrangement of sensing elements within the body, and the size and shape of individual gas-filled dielectric sensors.

Dispersion of neutron detecting elements in the moderator and its effect on neutron detection efficiency:

Traditionally, neutron detectors have been arranged in a generally cylindrical geometry with a central detecting element such as a gas proportional tube or a bundle of fiber optic scintillators, surrounded by a generally annular body of neutron moderating material. Alternatively, devices have been constructed in a generally planar geometry with the detecting element disposed behind a plate of moderating material. In some instances, several layers of planar neutron detecting elements have been sandwiched in moderator; although this represents an improvement over the previous cases, it is not ideal. Applicants determined that in all of these cases, and particularly in the first two, overall neutron detection efficiency suffers because fast neutrons are not efficiently directed into the neutron detecting elements (where they are captured and detected) after having been moderated. There are two major reasons for this. By its very nature, the moderating material backscatters or reflects some neutrons away from the active volume of the detector. Also by its nature, neutron moderating material inevitably parasitically captures some neutrons. The likelihood of parasitic capture is directly related to the distance the neutron travels through the neutron moderating material, particularly the distance traveled while at or near thermal energy. Applicants postulated that, in general, the more closely the combination of neutron moderating material and neutron detecting elements approximated a homogeneous material, the greater the likelihood that a fast neutron (e.g. a spontaneous fission neutron from a plutonium-based warhead) would be detected by the device. Applicants postulated that this could be accomplished by using small neutron detecting elements (rather than large ones) and dispersing them throughout the neutron moderating material. Applicants postulated that the use of small neutron detecting elements dispersed throughout the device would reduce the average time delay between the time at which a neutron entered the device and the point at which the neutron was captured and detected by a neutron detecting element, thereby improving the resolution of the time of arrival of the neutron at the device. Applicants further postulated that several deviations from true homogeneity would also serve to increase neutron detection efficiency: 1. A more efficient device could be created by disposing some of the detecting elements closer to the surface of the moderator and thereby capturing some of these backscattered neutrons. 2. A layer of detecting elements closer to the surface would enhance the detection efficiency for thermal neutrons, as the average penetration depth of thermal neutrons into the neutron moderating material is comparatively shallow. A major practical design issue of a neutron detection system is that the neutron detecting elements tend to be expensive; because of this, a significant consideration in designing such a system is to maximize neutron detection efficiency per unit of system cost, effectively placing an upper bound on the number of neutron detecting elements that can be used. In consideration of this, Applicants further postulated that the density of neutron detecting elements in the neutron moderating material could be varied throughout the device such that the density is higher in areas in which the thermal neutron fluence from an expected typical source is higher and lower in areas in which the thermal neutron fluence is low. (In this instance, we are referring to the thermal neutron fluence as a function of location in the device; it will be understood that many of these thermal neutrons were fast neutrons when they first entered the device, prior to the thermalization process.) Applicants postulated this on the basis that a neutron detecting element located in an area with a higher thermal neutron fluence would yield a higher count rate than the same element located within an area with a lower thermal neutron fluence. Applicants further postulated that the energy of a neutron will affect its probability distribution function for the location (i.e. particular neutron detecting element) at which it is captured and detected in the device and that as a result of this, knowledge of the spatial distribution of neutron detection events throughout the device can be used to estimate the neutron energy spectrum and the neutron source type (e.g. fissile material or Pu—Be), should one be present. Applicants further postulated that in a correctly designed device, the spatial distribution of neutron detection events throughout the device can be used to estimate the predominant direction of travel of neutrons entering the device and even the dependence of direction of travel on neutron energy. Applicants further postulated that analysis of data regarding neutron energy, direction, and time of arrival at the device could be exploited to discern information such as probable direction to a neutron source (if such a source were present), probable neutron source type, and, in some circumstances, approximate neutron source strength. Applicants also postulated that analysis of this data could assist in ascertaining whether or not a neutron source above background was present under circumstances where variation in raw neutron count rate was insufficient to do so.

Applicants determined that neutron spectral and directional information could be obtained from a device in which two pairs of independently readable neutron sensing elements are disposed within a volume of neutron moderator such that preferably no more than 2 g/cm$^2$ and more preferably no more than 1.5 g/cm² areal density of moderating material separates the sensing elements of the first pair from one outside surface of the detector, and a greater areal density (preferably around 2 to 4 g/cm²) of moderating material separates the sensing elements of the second pair from one outside surface of the detector, and both sensing elements of each pair return substantially equivalent neutron detection results when a neutron flux is applied to the apparatus from one direction and return substantially different neutron detection results when a neutron flux is applied from another direction. For a typical neutron moderator, such as high density polyethylene (HDPE), sensitivity to thermal and near-thermal neutrons is highest within a depth from the surface of the device corresponding to about 1.5 g/cm² areal density of neutron moderator. This is because thermal neutrons have a limited range of penetration into the moderator and tend to be backscattered or parasitically captured if not captured within about the first 1.5 g/cm² areal density of material. (For a neutron moderator such as water with a density of 1 g/cm³, this corresponds to a depth into the moderator of 1.5 cm. For a plastic, for example, with a density of 0.8 g/cm³, this corresponds to a depth of 1.875 cm.) For higher energy neutrons typically observed in the field from neutron sources of interest, sensitivity is substantially higher throughout the region whose distance from the surface of the device is equivalent to an areal density of between 1.5 g/cm² and 4 g/cm² of material. (For 1 g/cm³ material, for example, this is equivalent to between 1.5 cm and 4 cm.) Because most neutron target materials (e.g. $^3$He, $^{10}$B, $^6$Li) are most efficient at capturing thermal neutrons (and thereby detecting the neutrons via emission of one or more charged particles into the neutron sensing element), incoming neutrons whose energy is well above thermal (e.g. fast neutrons) are most efficiently detected by neutron sensing elements located some distance inside the neutron moderating material, where higher energy neutrons have had more opportunity to thermalize. (Note that an exception is when H atoms are used as the neutron target material, in which case neutron sensing elements closer to the surface will often be more sensitive to higher energy neutrons.) This difference in response based on neutron energy is important because it enables the device containing the neutron sensing elements to measure both lower (thermal and near-thermal) and higher (e.g. fast) energy neutrons and provide an indication of the intensity of both. This information can then be used to estimate the type of neutron source (e.g. a purely thermal source; a fast source surrounded by moderator that thus leads to both thermal and fast neutrons reaching the device; an unshielded fast source) and in some instances the degree of shielding between the source and the device. Although this device has two pairs of independently readable neutron sensing elements located at different distances inside the device from its surface, the device may have many more neutron sensing elements than this. For example, the device may have a dozen or more layers of neutron sensing elements with many neutron sensing elements within each layer. In general, increasing the number of layers and number of neutron sensing elements within each layer increases the accuracy with which both spectral and directional information can be acquired, as well as increasing the neutron detection efficiency. Acquiring neutron directional information is similar to acquiring neutron spectral information. It is important to design the device such that the variation in characteristic response (e.g. count rate) with the direction of incoming neutrons is non-uniform for the neutron sensing elements in the device. This may be accomplished by following the exemplary parameters listed above; namely, that two neutron sensing elements are separated from the surface of the device by no more than about 1.5 g/cm² areal density of neutron moderator and two neutron sensing elements are separated from the surface by between 1.5 and 4 g/cm² areal density of moderator. When the direction of incoming neutrons changes, in effect, the depth of the neutron sensing elements also changes, which in turn changes the response of the neutron sensing elements. The change in effective depth may be explained as follows. For example, for a neutron entering normal to the surface of a generally planar device and traveling directly towards a neutron sensing element, the distance the neutron must travel to reach the neutron sensing element is the distance separating the edge of the neutron sensing element from the surface of the device. For a neutron entering the device at an angle of 45 degrees and traveling directly towards a neutron sensing element, this distance is increased to 1.414 times the distance between the edge of the neutron sensing element and the surface of the device. For neutrons of a given energy spectrum arriving at the device, the characteristic response pattern of the neutron sensing elements will change according to the direction of travel of the neutrons. In most real-world scenarios, neutrons arrive at a detector from all directions due to background neutron radiation, with an enhanced number arriving from the direction of a neutron source (e.g. Pu or $^{252}$Cf), should one be present. Analysis of the neutron detection pattern across the neutron sensing elements in a device can provide information about the energy spectrum and directionality of incoming neutrons. This analysis is preferably performed by software algorithms or other electronic-based means, with results then reported back to the user.

Applicants determined that neutron spectral and directional information could be obtained from a device in which at least four independently readable neutron sensing elements are disposed within a volume of neutron moderator, with the four neutron sensing elements forming three pairs of neutron sensing elements, such that each pair defines a different non-parallel direction, and such that for one of the three pairs of said sensing elements, each of the two neutron sensing elements forming that pair return substantially equivalent neutron detection results when the apparatus is exposed to a neutron flux coming from one direction and return substantially different neutron detection results when a neutron flux is applied from another direction. The significance of having three non-parallel directions is that it enhances the separation of directional and spectral information. The distance that neutrons travel through the neutron moderating material in the device prior to being captured and detected in a neutron sensing element is related to their energy; for a given neutron energy, a given probability distribution exists and this distribution changes with neutron energy. Neutron sensing elements facing the direction from which source neutrons are arriving will typically experience a higher count rate than neutron sensing elements facing away; this is due to the shielding effect of the detector body. (If the detector is small compared to the average depth of penetration of the neutrons into it, the relationship between neutron direction and spatial distribution of detection events will become more complex.) The use of three non-parallel directions for the distribution of the neutron sensing elements ensures that information obtained from the spatial distribution of neutron counts across each of the three pairs will be non-redundant. Naturally, the greater the number of neutron sensing elements used, the better the resolution (in general) of the neutron energy spectrum and direction of travel of the neutrons. In general, if the device is symmetric in shape, the preferred orientation of the three non-parallel axes is orthogonal to each other in the coordinate system of the device in which they are employed. So for example, if a device is cubic in shape, the neutron sensing elements are preferably distributed in an x, y, z Cartesian coordinate system, following the shape of the device. (Note that the optimal spacing between neutron sensing elements will usually be smaller near the edges of the device and larger towards its center.) As another example, if a device is spherical in shape, the neutron sensing elements are preferably distributed as a series of spherical layers of elements at various distances into the device. (In other words, sensors in an individual layer are at a fixed radius and different longitudinal and latitudinal locations, while different layers are at different radii, all following the spherical coordinate system.) For a cylindrical device, the preferred distribution of neutron sensing elements is in the form of cylindrical layers inside the cylindrical device, the neutron sensing elements in each layer having a fixed radius, $\rho$, with the $\phi$ and z values determining the location of an individual neutron sensing element within that layer. Those skilled in the art will appreciate that this concept can be readily extended to other geometries and that for many different possible geometries, one can identify a configuration that is the equivalent for that geometry of a planar array distribution in a panel-type device.

It will be understood that the sensing elements may be disposed within a substantially monolithic mass of moderator material or they may be interleaved with layers of moderator material to achieve the same purpose, viz., disposing some detecting elements to capture neutrons that have passed through a greater amount of moderator and disposing other detecting elements to capture neutrons that have passed through a lesser amount of moderator and might otherwise be lost through reflection or backscattering.

Suitable neutron moderators have a substantial amount of low atomic weight atoms that have comparatively high cross sections for neutron scattering and relatively low neutron capture cross sections. Some preferred neutron moderators are water (including heavy water), polymers (e.g. plastics), polymer composites, granular inorganic materials, concrete, and graphite. Elements and isotopes that provide good neutron moderation include H, Be, $^{11}$B, C, and N. Of these, H is most preferred. (Note that N has a moderate thermal neutron capture cross section and thus is not normally a first choice from this group.) Solid, liquid, or very high density (e.g. high pressure) gaseous materials composed of elements and isotopes selected from this list will normally make good neutron moderators; an example of this is HDPE, being composed of H and C atoms. Materials having a substantial amount of their constituents coming from this group and having a relatively low neutron capture cross section are also frequently good moderators; an example of this is water, which is composed of H and O atoms. In general, to function well as a neutron moderator, a material should comprise at least about 5% atom density of one or more elements and/or isotopes that have particularly suitable moderating qualities (e.g. H, Be, $^{11}$B, C, and N). Those skilled in the art are familiar with both the properties that tend to make a material a good neutron moderator and with materials that are known to be good neutron moderators.

Use of neutron sensing elements.

A wide variety of neutron sensing elements may be used. Neutron sensing elements normally employ a neutron target material (they go by various names; they may be called neutron-sensitive or neutron-reactive materials and some types and configurations are called neutron converters) that can emit one or more charged particles when a neutron interacts in the material; ionizations produced by these charged particles are then detected and used as an indicator of a neutron interaction. Particularly suitable materials include H (proton recoil from scattering of energetic neutrons), He (particularly $^3$He), Li (particularly $^6$Li), B (particularly $^{10}$B), C, Gd, Th, U (particularly $^{235}$U), and Pu. A wide variety of different neutron sensing elements may be used, including dielectric sensors, miniature $^3$He proportional counters, microchannel plates, microsphere plates, other gas-based neutron sensors, semiconductor-based neutron detectors, neutron scintillators, and others. The key feature needed from such neutron sensing elements is the ability to localize a neutron detection event to within a particular sensing element or group of sensing elements, with sufficient position resolution to achieve the sensing element distribution requirements described elsewhere.

The invention is preferably carried out using sensors that are particularly sensitive to thermal neutrons (e.g., 20 times more sensitive to neutrons with energy below about 10 eV than to neutrons with energy greater than 100 keV). Those skilled in the art will appreciate that a particular sensor will display some characteristic distribution function when the relative number of neutron captures is plotted against neutron energy. Dielectric balloon sensors, which are described in more detail in the following example, have a distribution function that peaks sharply at neutron energies below about 1 eV. For a typical neutron detection case, the sensitivity of these detectors for neutrons with energy lower than about 50 keV (the number of neutrons detected whose energy is below this energy at the time of capture) is on average more than 500 times higher than for those with energy greater than 50 keV. Preferred detectors for use in the present invention have a neutron sensitivity distribution function in which at least 99% of the area under the distribution lies below about 1 eV.

Dielectric balloon sensors as a suitable type of neutron detecting element.

One suitable means for detecting neutrons uses small, gas-filled dielectric chambers (preferably small spheres) in which breakdown of the gas produces a measurable electrical signal as described in detail in Applicants' co-pending patent application and shown schematically in FIG. 1A. The operation of a gas filled balloon neutron detector is as follows. Physically, the balloon comprises an outer shell and a hollow interior filled with gas. A wide variety of dielectric materials may be used for the outer shell, of which glass is one preferred material. The gas inside the balloon contains at least one type of atom that can interact with a neutron to produce energy deposition within the gas. For example, $^3$He atoms in the gas can capture neutrons and upon so doing, undergo a nuclear reaction in which 764 keV of energy is released; this energy is released in the form of kinetic energy imparted to the triton and proton particles released by this reaction. As these reaction products travel through the gas, they ionize the gas, producing electron-ion pairs (electrical charges). The presence of these charges within the gas may be sensed by one or more electrodes connected to appropriate electronics. The charges perturb the electric field produced by one or more electrodes, producing a change in the electrical state of one or more electrodes. This change in electrical state forms a signal that is detected by the electronic circuit connected to the electrodes. The characteristics of the signal may then be analyzed if desired in order to extract information about the event creating the signal, determine whether the signal was produced by a neutron interaction or some other phenomenon (e.g. electronics, gamma interactions in the detector), etc.

EXAMPLE 1

Applicants constructed a number of dielectric sensors consisting of gas-filled spherical balloons 10 (i.e. having an outer shell 11 and a hollow interior 12 filled with gas). Based on calculations of electrical conductivity, particle transport and energy deposition, and long-term gas retention, the sensors had an outer diameter of 7 mm with 200 μm thick glass walls 11. The interior 12 of each sensor was filled with a gas mixture consisting of $3\times10^5$ Pa of $^3$He and $5\times10^5$ Pa of Ar. This combination of gas composition, gas pressure, and sensor size was sufficient for most $^3$He neutron capture events to deposit much or all of the energy released from the neutron capture reaction (in the form of energetic reaction products) in the sensor gas. Simultaneously, the combination of sensor size and gas pressure or density was low enough such that most gamma-induced electrons produced only minimal energy deposition in a sensor.

The glass consisted of a modified fused silica with a low gas diffusion rate for $^3$He (estimated 90% retention for at least 30 years) and a resistivity of approximately $2\times10^{11}$ Ω-cm. The resistivity value enabled conduction of charge reaching the interior sensor wall through the wall, thereby avoiding a saturation effect in which excessive charge buildup diminishes the strength of the electric field in the sensor and consequently diminishes the neutron pulse amplitudes. (This effect is described later.) The dielectric constant of the glass and the sensor wall thickness compared to the total sensor size were such that when a potential voltage was placed across a sensor, most of the voltage drop occurred within the gas-filled region of the sensor, as opposed to the wall.

To operate a sensor, two electrodes 13 were placed on opposite sides of the sensor. To hold the sensor and electrodes in place, the sensor was sandwiched between two printed-circuit (PC) boards, with the electrodes mounted on the surface of each PC board that faced the sensor. A high-voltage power supply was used to apply a DC voltage to the electrodes 13. The anode was connected to an off-the-shelf preamplifier, shaping amp, and computer-based MCA card for capturing the pulse height spectrum from the sensor. Voltages between 20V and 1000V DC were applied to single sensors and to multiple sensors in parallel, creating an electric field across and through the sensor. The electric field was strong enough to sweep charge across the sensor gas to the interior sensor wall, but not strong enough to cause breakdown and continuous discharge of the gas.

When a neutron was captured by a $^3$He atom in a sensor, the reaction released 764 keV of energy, creating thousands of ionizations in the sensor gas. Under the influence of the electric field produced by the DC voltage applied to the external electrodes 13, the electrons and ions would move across gas-filled region of the sensor, traveling toward the portion of the interior sensor wall adjacent to the anode and cathode, respectively. The duration of charge flow across the sensor was in the microsecond range for the electrons and rather longer for the ions. This charge flow produced a pulse that was amplified and shaped by the preamplifier and amplifier and then sent as input into the MCA card, where pulses were collectively recorded and displayed on the computer as a pulse height spectrum. Because of the time constants in the preamplifier and amplifier and the relatively slow drift velocity of the ions in the gas as compared to the electrons, the neutron pulses were formed primarily by electron drift, causing them to appear as a broad shoulder in the pulse height spectrum.

Computer software was used to control the MCA card. A lower-level discriminator (LLD) was set such that the amplitude of most neutron pulses exceeded the LLD, causing them to be counted, while essentially all gamma pulses were below the LLD and thus were not counted.

Dispersion of neutron detecting elements in the moderator and its effect on neutron detection efficiency:

The invention comprises a number of individual sensors 10 located at various points within a mass of moderator material 14 as shown schematically in FIG. 1B. For various geometrical arrangements, the following model calculations were carried out and have been supported by experimental results as described in detail in the following Example.

EXAMPLE 2

FIG. 2 shows the neutron detection efficiency for neutrons emitted by plutonium (via spontaneous fission) for three cases. In all cases, the detector(s) are held within a 100 cm wide×100 cm high×25 cm thick HDPE matrix material, with an additional 10 cm thick HDPE reflector located on each side of the detector to improve neutron detection efficiency (making the entire structure 120 cm×120 cm×25 cm). The neutron detection efficiency is defined as the likelihood that a neutron entering the device will be captured in (and therefore detected by) a neutron detecting element (e.g. a dielectric sensor) in the device. In this example, the plutonium-emitted neutrons are assumed to enter the detector uniformly across the 100 cm×100 cm surface perpendicularly. In all four cases, the detectors detect a neutron when the neutron is captured by a $^3$He atom, causing an atomic reaction that releases 764 keV of energy and is easily detectable. The three cases are as follows:

Case #1 is a device consisting of 13 layers of small spherical balloon neutron detectors. Each balloon neutron detector is hollow with the inner cavity containing $^3$He gas for neutron sensitivity and having an inner diameter of 6.6 mm. Each layer consists of a square matrix of 139×139 detectors covering an area of 1 $m^2$. As can be seen in FIG. 2, for this case, 46% of the neutrons are detected due to being captured by $^3$He atoms in the balloon detectors.

In Case #2, the detectors in Case #1 have been replaced by a single, large detector having the same total volume and pressure of $^3$He as the detectors in Case #1. The detector in Case #2 is cylindrical, stretching across the 100 cm height of the device and having a radius of ~11 cm, giving it the same total volume as the Case #1 detectors. It is located at a depth into the HDPE matrix that optimizes its neutron detection efficiency. Its neutron detection efficiency is less than 6%.

In Case #3, the detectors in Case #1 have been replaced by twenty cylindrical detectors of 100 cm height and 2.453 cm radius, thereby having the same total volume and pressure of $^3$He as the detectors in Case #1. These twenty detectors are placed side-by-side in a single layer of 1 $m^2$ area and are located at a depth into the HDPE matrix that optimizes neutron detection efficiency. The neutron detection efficiency of the device is 24%.

As noted earlier, depending on the demands of a particular application, detectors may be configured in cylindrical or planar geometries (as well as others). The following example describes an embodiment of the present invention in which the gas-filled spheres of the previous example are built up with alternating layers of moderator material in a substantially planar geometry.

EXAMPLE 3

A device with a substantially planar geometry can be created and used to preferentially detect neutrons entering the device in a perpendicular direction. For an application such as scanning a vehicle for the presence of special nuclear material (SNM), a device with a planar surface area of 0.2 $m^2$ or more and a thickness of 20 cm or greater is preferred. In this example, the bulk of the device consists of a material (e.g. HDPE) that is effective at moderating fast neutrons (e.g. neutrons with energies of 100 keV or more). Neutron-detecting balloons are interspersed within the material in such a way that their collective neutron detection efficiency is optimized. For a device containing 13 layers of neutron-detecting balloons of 6.6 mm inner diameter with $3\times10^5$ Pa of $^3$He gas filling and 0.72 cm center-to-center spacing between the balloons in a single layer, preferred depths of the layers into the device from the surface facing the vehicle to be scanned are 0.35, 1.5, 2.5, 3.5, 4.5, 5.5, 6.5, 7.5, 8.5, 10, 11.5, 13 and 15 cm. These locations provide the device with good neutron detection efficiency across a neutron energy range from thermal (~0.0254 eV) to 10 MeV or more; this range includes the range of neutron energies expected to be seen from both shielded and unshielded SNM, such as plutonium. For a 4 layer device with 1 cm center-to-center spacing between the balloons located on a particular layer, preferred depths of the layers are 0.35, 3, 6 and 10 cm. In both these cases, a layer of additional moderator/reflector material (e.g. HDPE, Be, $H_2O$) placed around the edges of the device will further enhance neutron detection efficiency. It will be appreciated that the preferred value of parameters such as balloon size, gas fill pressure, spacing of balloons within a single layer, number of layers, spacing of layers, device size, and device thickness will vary with factors such as the specifics of the application (e.g. expected distance between the device and potential SNM, scanning time available, size constraints, cost constraints, etc). It will also be appreciated that the value of many parameters can be changed without substantially changing the performance of the device. For example, the location (depth) of the layers of neutron-detecting balloons can often be shifted by several cm without substantially changing the total neutron detection efficiency of the device.

It will be appreciated that many suitable neutron moderating materials are known. One preferred material is HDPE, which is readily available and relatively inexpensive. Other polymers and polymer composites are also suitable and the polymers may further contain particulate materials or filler to further improve their neutron moderating capability or to tailor other engineering properties such as strength, density, optical opacity, and the like. In the foregoing Example, it was contemplated that the individual layers of moderator material are substantially the same composition. In some applications it may be desirable to have different moderator materials in different areas of the detector assembly. This may be achieved by using sheets of different materials (in a planar geometry) or by using a monolithic functionally-graded moderator whose composition changes in one or more directions within the material.

In Examples 2 and 3 above, the neutrons are assumed to be entering the device from the surface facing a vehicle being scanned, as would be expected in the event that a neutron source were present in the vehicle. It will be appreciated by those skilled in the art that the selection of 25 cm for the thickness of the device represents a design in which a substantial fraction of the 25 cm thickness—specifically, on the side facing away from the vehicle—acts as a neutron reflector. Although adding additional thickness of moderator to the far side of the device acts to increase neutron detection efficiency, the incremental increase in neutron detection efficiency with each unit of increase in reflector thickness diminishes as the device becomes thicker and thicker. In the examples above, further increases in thickness produce minimal improvement in neutron detection efficiency for neutrons of less than about 10 MeV.

Flexibility for ease of use and transportation.

EXAMPLE 4

The balloons (or gas-filled beads) of the previous Example may be held in place in a generally flexible layer and the moderator material may likewise be flexible, allowing the entire assembly to be rolled into a generally cylindrical shape. Layers containing the balloons can be physically unattached to, or separable from, layers of moderator to enable disassembly of a relatively thick device into thinner constituent pieces that can be more easily rolled up or otherwise bent. As a result, the device can be more readily transportable than it would be were it in a rigid form.

Operation singly or in parallel and estimation of neutron source type.

It will be appreciated that the discrete neutron detecting elements may be individually addressed by the data collection system, or they may be ganged in parallel. Three possibilities exist: (1) all neutron detecting elements are individually addressed by the data collection system; (2) neutron detecting elements are ganged in parallel into multiple channels in the data collection system (i.e. some or all of the channels have multiple neutron detecting elements connected to them); and (3) all neutron detecting elements are ganged into a single channel in the data collection system. Although in the third case, it is sometimes possible to obtain some spectroscopic and directional information, such as by designing the device such that it responds preferentially to neutrons arriving from a particular range of angular direction or to neutrons within some energy range, this is usually very ineffective. Instead, the first and second cases are preferred as they have substantially greater scope for obtaining information about neutron energy and direction. Of these, the second case is preferred in instances when the neutron detecting elements are small (e.g. cm-size range or smaller) and their number is large (e.g. hundreds, thousands, or more). The reasons for this are as follows. When forming the dielectric neutron detecting elements in Example 1 into a large device, such as the neutron detector panels described in Examples 2 and 3, the large device may contain tens of thousands of neutron detecting elements. Because there is a cost associated with each channel in the data collection system (e.g. for the signal processing electronics needed for each channel), a practical approach is to gang a number of neutron detecting elements in parallel into each channel. Further, when a large number of neutron detecting elements are used in a device, it is frequently the case that a group of neutron detecting elements in close proximity to each other have very nearly the same response functions for neutrons as a function of neutron energy and direction. When this is the case, it is often sufficient to know that a neutron detection event occurred within that specific group of neutron detecting elements without knowing which particular neutron detection element detected the neutron. The following examples demonstrate this.

EXAMPLE 5

MCNP calculations were performed for the 13 layer planar device described in Example 3 irradiated with a series of monoenergetic neutron fluences from thermal (0.0254 eV) to 10 MeV. Counts (i.e. neutron detection events) were summed for each of the 13 layers for each monoenergetic neutron fluence; in other words, the spatial distribution of neutron detection events within each layer was ignored and only the distribution between layers was considered. It was found that the count distribution across the layers varied strongly with the neutron energy, following the general pattern that the higher the neutron energy, the greater the depth into the device at which the distribution of counts peaked. This is shown clearly in FIG. 3. If the device is exposed to a neutron flux of unknown energy spectrum in the same way that it was exposed to the series of monoenergetic neutron fluences described above, the resulting distribution of neutron counts across the layers of neutron detecting elements can be analyzed using known response functions (e.g. the distribution shown in FIG. 3) to estimate the energy spectrum of the applied neutron flux, along with an estimate of the statistical uncertainty of the calculated neutron energy spectrum. In this case, ganging the sensors in each layer in parallel to a single channel was adequate for obtaining spectroscopic neutron information because the neutron detecting elements in each layer had very similar responses to neutrons as a function of neutron energy.

EXAMPLE 6

MCNP calculations were performed for the 13 layer planar device described in Example 3 irradiated with two different neutron source types: plutonium, which produces spontaneous fission neutrons, and Pu—Be, which produces neutrons primarily via an (n, α) reaction. Calculations were repeated using the same sources but with shielding around them. The shielding had the effect of changing the neutron energy spectrum, increasing the number of low energy neutrons (thermal and epithermal) and decreasing the number of fast neutrons.

The distribution of neutron counts across the 13 layers of neutron detecting elements in the device is distinctly different for the plutonium than for the Pu—Be, both for unshielded and shielded cases. (This is shown in FIG. 4. Counting statistics are evident in the data as the total number of counts is low.) As can be seen, the addition of shielding substantially increases the number of neutron counts in the first several layers (the leftmost bars for each source case). This is because significant numbers of neutrons from the source interact and lose much of their energy in the shielding around the source; these neutrons are then more likely to interact in the layers closest to the surface of the device as those layers are most sensitive to thermal and near-thermal neutrons. Comparing the results for Pu and Pu—Be, it is seen that Pu—Be produces a larger number of counts in the layers of neutron sensing elements further from the surface of the device (the rightmost bars for each source case). Pu—Be sources produce a much larger fraction of their neutrons above 3 MeV than do Pu sources and the further a layer of neutron sensing elements is from the surface the higher the energy of the neutrons it is most sensitive to. These results are significant because they show that these two source types can be differentiated based on their neutron energy spectrum. Based on this type of differentiation, data analysis software can also indicate to the user how likely it is that a source represents a potential threat, from which a judgment can be made about the type of action to be taken (or not taken, as the case may be). In this example, plutonium is a material that if observed out in the field (e.g. in a truck or cargo container) has a comparatively high probability of representing a serious threat to national security and well-being. By contrast, Pu—Be neutron sources are frequently used in research and other applications and are of comparatively low value to a terrorist group.

Further, although the distribution of counts from the plutonium and Pu—Be sources across the 13 layers of neutron detecting elements changes when moderator is placed around the sources, the distribution is still distinctly different. (This is shown in FIG. 5, as explained below.) A simple analysis method is to use the fraction of total neutron counts falling within the first 3 layers closest to the surface as an indicator of the degree to which the source is shielded and the fraction of total neutron counts falling within the last 4 layers as indicator of the relative energy distribution of higher energy neutrons from the source. Using this approach, the energy spectrum of a neutron source can be classified and compared to the characteristic energy spectrum of different sources in order to estimate the neutron source type. FIG. 5 shows a plot of the detector response data for shielded and unshielded plutonium and Pu—Be sources with the count fraction of layers 10-13 on the x axis and layers 1-3 on the y axis. As can be seen, the plutonium and Pu—Be sources occupy distinctly different locations on the graph. As the sources are changed from an unshielded to a shielded state, their location on the graph shifts. Even after this shift, they still occupy distinctly different locations. This shows that spectroscopic information obtained in this way may be used to estimate the type of neutron source present. It will be appreciated by those skilled in the art that the data may be processed and source type estimates made in different ways.

Obtaining energy information and directionality simultaneously, while also maximizing neutron detection efficiency.

Using the principle of many small sensors dispersed throughout a moderating material, it is possible to construct a neutron detector that is capable of simultaneously obtaining neutron spectral and directional information, while retaining high neutron detection efficiency. As described earlier, neutron spectral information may be obtained on the basis of the distribution of neutron detection events throughout the device, the underlying principle being that average depth of neutron penetration prior to capture and detection increases as neutron energy rises. Similarly, the distribution of neutron detection events throughout the device also provides information concerning the direction of neutron travel. When a neutron enters a device of a reasonable size with no concave surfaces (e.g. cubic or spherical), it is more likely to be captured and detected in a neutron detecting element located closer to the side of the device it entered than in one located closer to another side. This difference in likelihood means that the distribution of detection event locations can be analyzed to determine whether neutrons are arriving at the device isotropically (evenly distributed across all directions) or are biased towards one or more directions.

Because this directional analysis can be performed simultaneously with obtaining neutron spectral information, correlations between neutron direction and energy can be obtained and exploited during the data analysis process. For example, if analysis of neutron detection location distribution throughout a device determined that low energy neutrons (e.g. thermal neutrons) were arriving at the device in an approximately isotropic fashion, while fast neutrons (e.g. 100 keV and above) were arriving predominantly from one direction, one would conclude that a fast neutron source is present in that direction.

Further, the ability to detect correlations between neutron energy and direction enables detection of neutron sources under circumstances when they would not normally be detected using conventional techniques. When using the present state-of-the-art, $^3$He proportional counters, the presence of a neutron source is ascertained by looking for a rise in neutron count rate above normal background levels. Low-level background neutron radiation is present in the environment because of cosmic rays interacting with atoms in earth's atmosphere and on its surface. Under normal circumstances, a neutron detector kept in a fixed location will have some neutron count rate from background radiation. Although the count rate will vary somewhat over short periods of time because of statistical fluctuations, its average over long periods of time will be constant. If the count rate rises above its normal range of values from background radiation (the average plus some value for statistical variation), it is concluded that a neutron source is nearby that is causing the rise in count rate. An advantage of being able to obtain information about neutron energy and direction is that neutron sources can sometimes be detected under circumstances where they do not produce enough of a rise in the raw neutron count rate to be detected. Examples are as follows. The energy spectrum of the background neutron flux is concentrated in the thermal range. If a weak fast neutron source is present, it may raise the number of fast neutrons being detected by the device sufficiently for a statistically significant rise above background to be identified, indicating the presence of a source. At the same time, it may not increase the total neutron count rate enough for a statistically significant rise to be identified. This is true because the variation in neutron count rate due to counting statistics is usually proportional to the square root of the neutron count rate. For example, suppose a background neutron flux is 99% thermal and 1% fast and a fast neutron source is introduced. If the total neutron count rate is used to determine whether a neutron source is present, a certain rise in the neutron count rate from the device is required in order to identify the presence of a source. On the other hand, if the device counts only fast neutrons (or can distinguish fast neutrons from thermal neutrons), the fast neutron count rate must rise by only one-tenth that which the total neutron count rate had to rise in order to identify the presence of a source. The same is true of neutron directional distribution; if there is a statistically significant rise in the number of neutrons coming from a particular direction without a statistically significant rise in the total neutron count rate, the presence of a neutron source can be deduced when this would otherwise not be possible from total counts alone. Clearly, combinations of neutron energy and directionality can also be used in this way.

Physical principles underlying this are as follows. For fast or epithermal neutrons entering the device, the spatial location at which they are captured and detected should be a good indicator of the location at which they reached thermal or near-thermal energy. This is important because the location at which a neutron becomes thermalized is indicative of its initial energy when it entered the device; the higher the energy of the neutron, the farther on average that it will penetrate into the device before becoming thermalized. (The spatial distribution of locations at which neutrons of a particular energy become thermalized is a function of their energy and therefore indicative of their energy.) In this scheme, in order to know the spatial distribution of thermalization locations with reasonable accuracy, it is necessary that the neutrons be detected relatively near to the point where they became thermalized, the spatial location of the detection event providing an estimate of the spatial location of the point at which thermalization occurred. For this condition to be met, individual neutron detecting elements should be sufficiently closely spaced, of sufficient size, and have a sufficient likelihood of capturing and detecting a thermal neutron that passes through them such that the average distance between the location at which a neutron reaches thermal or near-thermal energy (e.g. less than 0.1 eV) and the location at which it is captured and detected in a neutron detecting element is less than the average distance of travel through the device from the point of entry to the point at which the neutron reaches thermal or near-thermal energy.

Directional sensitivity is obtained as follows. If a neutron source is present and neutrons from the source are reaching the detector, it will normally be the case that the neutrons are not arriving at the detector uniformly from all directions; in other words, the neutrons will be biased towards one direction, which is usually the direction of the source. (As explained earlier, it may be the case that thermal neutrons from the source are arriving isotropically from all directions because the neutrons are scattering off nearby objects, effectively randomizing their trajectories, while only the trajectories of fast neutrons are still correlated with the direction from the detector to the source. In this example, the detector can use the fast neutrons to determine the approximate direction of the source.) The directional bias of the neutrons is indicated by the distribution of neutron detection events in the neutron detecting elements being biased towards the side of the device facing the direction in which more neutrons are arriving from. For the device to see this directional bias, the thickness of the device should be greater than (and preferably more than twice) the average depth of penetration into the device by neutrons arriving at the detector from the neutron source. If the thickness of the device is much less than this, the device will be too small to yield a distribution of neutron detection events within it that is indicative of the direction of neutron travel.

In addition to obtaining neutron spectroscopic (energy distribution) information via the distribution of neutron detection events in neutron detecting elements dispersed throughout the device, another way to obtain energy information is by using neutron detecting elements with inherently different responses as a function of neutron energy. For example, a neutron detecting element containing $^3$He will be most sensitive to thermal neutrons and relatively insensitive to fast neutrons that travel into it. On the other hand, a neutron detecting element containing $UF_6$ gas in which $^{238}U$ is used exclusively will be sensitive to fast neutrons and insensitive to thermal neutrons because fast neutrons can fission $^{238}U$, whereas thermal neutrons cannot. As another example, neutron detecting elements containing H as the neutron target material are normally sensitive to fast neutrons only and not to thermal neutrons.

Time jitter, fission chain ID, active interrogation, and coincident counting.

Another feature of the inventive device is its ability to minimize the time between when the neutron enters the device and when it is captured and detected by a neutron detecting element. Minimizing this time jitter is important because the arrival times of neutrons at the device may be important for some applications. The physical principle behind minimizing time jitter is that when the energy of a neutron is low, the distance it travels prior to being captured and detected in a neutron detecting element should be minimized. This is because when a neutron has low energy (e.g. epithermal or thermal), it is traveling slowly enough for the time it takes to travel short distances (e.g. centimeters) to become significant (e.g. microseconds or more). In contrast to this, fast neutrons typically travel at several percent of the speed of light, making their travel times for short distances inconsequential under most circumstances. Because most neutrons are at or very near thermal energy when captured and detecting by a neutron detecting element, the time delay between reaching thermal energy and being captured and detected is the primary source of time jitter. When a fast neutron enters the device and scatters off moderator atoms, thereby losing energy, the location where it reaches thermal energy follows a random distribution; although some locations are more likely than others, the location at which this happens is not deterministic. Therefore in order to minimize the travel distance of the thermal neutron prior to capture and detection, one should use a large number of neutron detecting elements and disperse them throughout the device, especially in those areas of the device where a neutron will have the greatest likelihood of reaching thermal energy. Because the neutron detecting elements frequently have poor neutron moderating characteristics, a balance between moderator and neutron detecting elements is normally important; removing all moderator and using only neutron detecting elements will usually negatively impact performance, so eliminating the moderator and placing neutron detecting elements side-by-side is not normally a good approach to minimizing time jitter. A comparison of a single large neutron detecting element in a block of moderator versus a dispersion of neutron detecting elements having the same total volume as the single large neutron detecting element within the block of moderator will show that typically the time jitter is reduced in the latter case, even considering that the likelihood of the neutron being captured and detected upon entering a smaller neutron detecting element is likely to be substantially lower. Because the thermal neutron is less likely to be captured and detected when it enters the neutron detecting element, it is more likely to exit the neutron detecting element and travel around within the device before it enters another neutron detecting element and is captured and detected, thereby prolonging its distance of travel in the device and thus its time jitter.

Minimizing time jitter is important for several applications and modes of operation. Two examples are: use with active interrogation and fission chain identification.

In fission chain identification, time correlation of neutron detection events is used to increase the sensitivity of the device to fissile material. Background neutrons are normally randomly distributed in time. In a sub-critical system consisting of fissile material, some neutron multiplication events occur when neutrons induce fission in fissile atoms, causing the release of more neutrons. Even though the system is sub-critical, the stochastic nature of neutron transport, interaction, and production from atomic fission creates brief bursts (e.g. nanoseconds to microseconds) of neutron emission from fission chains as the fission chains begin and then die out. This means that when fissile material is present, a device may detect an abnormally large number of neutrons within a very short period of time, with the neutron burst being statistically unlikely to represent background neutrons alone. For example, suppose a device has a count rate of 10±3 neutrons per second from background neutron radiation and the neutron counts are randomly distributed in time. If the software controlling the device requires an increase of 5 σ (standard deviations) above background to determine that a neutron source is present, this would require 25 counts in a one second period of time. If 10 background counts and 10 counts from a neutron source occurred during a one second period of time, the device would not determine that the source was present. On the other hand, if the device were analyzing the time distribution of the neutron counts and the 10 counts from the neutron source were due to a fission chain and all occurred with a 50 microsecond time window, this time cluster of neutron counts would be statistically improbable in background neutrons alone and the software could determine that a neutron source was present with a high degree of confidence. When designing a device to take advantage of fission chain neutrons, the device is preferably designed to minimize time jitter while maintaining a high neutron detection efficiency. The software would preferably have thresholds sufficient to screen out most instances in which a cosmic ray interacts with an atom in or near the device, as cosmic ray interactions can generate multiple neutrons. It will also be appreciated that the ability to detect fission chain neutrons is affected by the number of neutrons released by the fission chain, the distance between the material in which the fission chain occurs and the device, the presence of any intervening shielding, the presence or absence of neutron moderator in the immediate vicinity of the material, and so forth.

In active interrogation, particles (e.g. neutrons, photons) are generated for the purpose of traveling into objects or areas that are being searched for fissile material. The particles interact with fissile material, in turn causing the fissile material to release particles (e.g. neutrons, photons) that, when detected, provide a signature indicating the presence of the fissile material. A common type of active interrogation uses a brief burst of neutrons generated from small fusion sources. The neutrons from this burst produce fission events (and thus neutron emission) in nearby fissile material, with a portion of the fission neutrons (e.g. delayed fission neutrons, dieaway neutrons) being emitted with a time delay relative to the interrogating neutrons. As interrogating neutrons dissipate, the fission neutrons from the target material come to dominate the neutron flux around the device, enabling the device to detect the presence of fissile material. Because neutron transport and fission happen very quickly, it is essential to use a device with a high resolution for neutron arrival time. Using active interrogation, the sensitivity of the device for fissile material can be much increased compared to passive detection (e.g. detecting neutrons emitted by spontaneous fission of fissile material). The urgent security need to increase fissile material detection sensitivity only increases the significance of designing the device to minimize time jitter in neutron detection. Further, because different types of neutrons (e.g. fusion neutrons, fission neutrons, delayed fission neutrons) have different energy distributions, neutron spectroscopy can be combined with active interrogation to increase the accuracy with which the different types of neutrons can be distinguished from each other and provide improved sensitivity to, and measurement of, fissile material. FIG. 6 shows a schematic of approximate time and energy distribution for neutrons in active interrogation.

An advantage of the present invention in fission chain identification and active neutron interrogation is that the use of many neutron detecting elements in the device enables high neutron count rates. In a $^3$He proportional counter (the present state-of-the-art), the resolving time (dead time) between neutron counts is typically several microseconds, meaning that the detector cannot distinguish and count neutrons at a rate greater than several hundred kHz. This limits the ability of $^3$He proportional counters to fully exploit fission chain neutron identification based on time-coincident neutron detection events nor to make full advantage of the sensitivity gains that are possible with active interrogation. By contrast, the present invention provides a much better approach in these areas as it enables a much higher maximum neutron counting rate, including the ability to count neutron detection events that occur simultaneously and not just within a short coincidence window. The reason for this is that in a device with many neutron detecting elements in which the neutron detecting elements are connected to signal readout channels in smaller groups, each signal readout channel can process a neutron detection event without limiting the ability of other signal readout channels to simultaneously process neutron detection events. Thus, given neutron pulses of fixed duration and resolving time (dead time), a device with 100 signal readout channels has a maximum neutron count rate 100 times greater than a device with only one signal readout channel. Further, the device with 100 channels will be able to count up to 100 neutron events that are truly simultaneous, one per channel. (It will be appreciated by those skilled in the art that the signal readout electronics must be appropriately designed for this to occur. However, moving from one or a few signal readout channels to many channels overcomes the physical bottleneck associated with resolving time.) The physical principle is that replacing a single large neutron detecting element (e.g. a $^3$He proportional counter) with many small neutron detecting elements enables the many small neutron detecting elements to be split into groups connected to different signal readout channels, thereby increasing the count rate capability of the device.

Data Analysis and Control Software

To maximize its usefulness, the device should be provided with software that provides real-time or near real-time data analysis and feedback to the user, as well as controlling the operation of the device. Some examples of functions the software could perform include neutron detection, estimation of neutron directionality, inferring information concerning neutron energy, and determining when a neutron source is present (other than background). The time of neutron detection events should preferably be measured and recorded; time resolution in the microsecond range is sufficient for many instances of active interrogation and fission chain neutron identification. By adding familiar hardware, such as a network connection, RF communication, etc. the software can also be used to communicate with other devices in order to share data or other information and synergistically obtain greater situational awareness about the presence, identity, location, etc. of neutron sources. For example, an active interrogation source may be used with the device to investigate a suspect object by placing the active interrogation source and the device next to suspect object and using the active interrogation source to produce brief bursts of neutrons that enter the suspect object. In this example, the device may be synchronized with the active interrogation source, enabling it to discard irrelevant neutron detection events (e.g. counts occurring during the neutron burst from the active interrogation source) and accept relevant neutron detection events (e.g. counts occurring once the neutron burst from the active interrogation source has ceased). The device could also communicate with other detectors, including other devices of the same type or different types of detectors, in order to share information such as location and number and characteristics of the neutrons detected. Sharing of such information, or alternatively, upload via a network connection to a data processing facility, can further improve source detection and identification. For example, intensity of neutron flux at multiple locations can be used to estimate source location, as can directional information. Likely neutron source type, size, and the presence or absence of shielding can be estimated based on data from a single device or from multiple devices in the vicinity of the same neutron source. If the user is moving, the device can record the spatial variation in neutron intensity and use this information to estimate the direction to the neutron source and/or its location. Estimates can be displayed to the user along with a level of confidence, or where insufficient data exists for an estimate to be made with reasonable confidence, estimates can be withheld and then made when sufficient data is available. For example, in a situation where a neutron source is clearly present but the neutron source type is not yet known, the device can indicate this to the user. As time passes and data accumulates, the device can indicate the probable neutron source type when enough data is available to make this estimate. The software can also indicate to the user how likely or unlikely a neutron source is to pose a threat. For example, a Pu—Be neutron source is not very likely to pose a substantial national security threat, whereas a neutron source consisting of a large amount of plutonium is much more likely to pose such a threat.

Incorporating multiple detector types into the device.

As described earlier, almost any type of neutron sensing element can be used that indicates the spatial distribution of neutron detection events. The inventive device may be made even more useful by incorporating additional radiation detecting elements into the device that are different from the type of neutron detecting elements described earlier. For example, a device could also include a NaI:Tl, LaBr$_3$, or HPGE (high purity germanium) spectroscopic gamma detector. This would enable the device to detect a wider range of materials with greater ability to differentiate between them with high statistical confidence, to differentiate between different types of neutron sources with a higher degree of confidence (virtually all neutron sources also emit large numbers of gamma rays), and would enhance its sensitivity for detecting neutron sources. The device could also include multiple types of neutron detectors. For example, in addition to the neutron sensing elements described in the present Application, the device could be augmented with a plastic or liquid scintillator for enhanced neutron spectroscopic capabilities at higher neutron energies (e.g. above 4 MeV). A plastic or liquid scintillator for neutron spectroscopy could serve as a neutron moderator in the device, enabling neutron spectroscopic information to be obtained in two ways, one via proton recoil in the scintillator and another via the depth of penetration prior to detection in a neutron detecting element method described earlier. (It will be understood that different types of sensors can be used in the detector, such as $^3$He filled sensors for neutron detection and sensors filled with hydrogenous gas for fast neutron detection via proton recoil.) Those skilled in the art will appreciate that a wide variety of sensing technologies may be incorporated into a single device.

An example of a portable device incorporating these features.

It is possible to create a small, portable device that embodies the features previously described, including the ability to obtain neutron directional and/or spectroscopic information and to minimize time jitter between when a neutron enters the device and when it is detected.

EXAMPLE 7

MCNP calculations were performed for a portable-sized device to determine sensitivity to neutron direction and energy and determine time jitter in neutron detection. The device would be 27×27×33 cm in size in the x, y, and z directions, respectively, and would consist of 2700 dielectric sensors arranged in a 30×30×30 matrix embedded in HDPE moderator. Dielectric sensors would be 7 mm in diameter and filled with $10^6$ Pa of $^3$He gas. In the z direction, layers of sensors would have 1.1 cm center-to-center spacing. In the x and y directions, sensors would have 0.8 cm center-to-center spacing. In the x and y directions, the device would have an extra 1.5 cm of HDPE moderator surrounding the outer sensors on each side. The size and weight of the contemplated device would make it easy to transport by vehicle and possible to transport by hand if needed.

To assess directional sensitivity, the postulated device was modeled as follows: neutrons having a plutonium spontaneous fission spectrum were directed into the −z side of the device traveling in the +z direction. (When sent into the −z face of the device, the neutrons were assigned random x, y starting locations across the face.) FIG. 7A shows the distribution of neutron capture (and therefore detection) events in the sensors in the x direction, FIG. 7B shows the same in the y direction, and FIG. 7C shows the same in the z direction. Looking at the calculated spatial distributions of neutron detection events shown in FIG. 7, it can be clearly seen from the graphs that the neutrons entered the −z face of the device traveling in the +z direction. It is further evident that a software algorithm could be easily created and used to estimate the direction of an incoming neutron fluence from the spatial distribution of neutron detection events in the device.

To assess the ability of the device to obtain neutron spectroscopic information and differentiate between different types of neutron sources, Applicants performed the same simulation as just described, only using several different neutron energy distributions. In one case, Applicants used thermal (0.0254 eV) neutrons; the spatial distribution of detection events for these neutrons in the z direction is shown in FIG. 8A. In other cases, Applicants used Pu spontaneous fission and Pu—Be neutron spectra; results for these two simulations are shown in FIG. 8B. It is evident from the distributions shown in FIG. 8 that these three different neutron sources (thermal, Pu, Pu—Be) produce substantially different spatial distributions of neutron capture events in the device. Based on these differences in response, the skilled artisan can create a software algorithm that analyzes the spatial distribution of neutron detection events and estimates the type of neutron source present.

Applicants also determined the time jitter associated with the delay between when a neutron enters the device and when it is captured and detected in a dielectric sensor. In the MCNP simulations, Applicants used Pu neutrons as described earlier. FIG. 9 shows the cumulative distribution function for neutron detection events as a function of time elapsed between neutron entry into the device. As can be seen, most neutrons are detected within several tens of microseconds and practically all are detected within one hundred microseconds.

The device was calculated to have a neutron detection efficiency of 28% for Pu neutrons based on the calculations described earlier. In the current state-of-the-art, many large area neutron detectors have Pu neutron detection efficiencies in the range of 15-20%. The device described in this example thus would have good sensitivity relative to the present state-of-the-art.

It will be appreciated that while the design set forth in the foregoing example is intended to demonstrate that the invention is capable of achieving its desired ends, the exemplary design is not necessarily optimized for every particular detection scenario. For example, the placement of thin layers of neutron absorber at several judiciously selected locations in the device would likely enhance the ability of the device to obtain neutron spectroscopic information. As another example, incorporating another type of neutron detecting element (e.g. a liquid scintillator for fast neutron detection via proton recoil) could potentially enhance the amount of neutron spectroscopic information obtained. The skilled artisan may thus modify the design for particular applications without undue experimentation.

We claim:

1. An apparatus for detecting neutrons comprising:
 a volume of neutron moderating material; and
 two pairs of independently readable neutron detecting elements disposed within said moderator volume, the first of said pairs being equidistant from a selected outside surface of said moderator and separated from said selected outside surface of said moderator by no more than 2 g/cm² areal density of said moderating material, and the second of said pairs being equidistant from a selected outside surface of said moderator and separated from said selected outside surface of said moderator by a greater density of moderating material than separates said first pair from said first selected surface.

2. The apparatus of claim 1 wherein said neutron moderating material comprises a material selected from the group consisting of: water, heavy water, granular inorganic materials, graphite, concrete, polymers, and polymer composites.

3. The apparatus of claim 2 wherein said moderating material comprises a material containing at least 5% atom density of an element selected from the group consisting of: H, Be, B, C, and N.

4. The apparatus of claim 1 wherein at least some of said neutron detecting elements comprise gas filled hollow dielectric capsules.

5. The apparatus of claim 4 wherein said neutron detecting elements further comprise:
 electrodes disposed in electrical contact with opposite sides of said hollow dielectric capsules whereby an electrical pulse may be collected in response to the passage of said neutron; and,
 a detecting circuit connected to said electrodes.

6. The apparatus of claim 1 wherein said moderator comprises a geometrical shape selected from the group consisting of: rectangular prisms, spheres, and cylinders.

7. An apparatus for detecting neutrons comprising:
 a volume of neutron moderating material; and,
 at least four independently readable neutron detecting elements disposed within said moderator volume, said four elements arranged to form three individually addressable pairs defining three non-parallel directions,
 wherein each of said three pairs is characterized by the property that each of the two respective detecting elements forming said pair return substantially equivalent neutron detection results when the apparatus is exposed to a neutron flux coming from one direction and said two detecting elements return substantially different neutron detection results when a neutron flux is applied from another direction.

8. The apparatus of claim 7 wherein said three nonparallel directions comprise three axes of a cartesian coordinate system.

9. The apparatus of claim 7 wherein said neutron moderating material comprises a material selected from the group consisting of: water, heavy water, granular inorganic materials, graphite, concrete, polymers, and polymer composites.

10. The apparatus of claim 7 wherein at least some of said neutron detecting elements comprise gas filled hollow dielectric capsules.

11. The apparatus of claim 10 wherein said neutron detecting elements further comprise:
 electrodes disposed in electrical contact with opposite sides of said hollow dielectric capsules whereby an electrical pulse may be collected in response to the passage of said neutron; and,
 a detecting circuit connected to said electrodes.

12. The apparatus of claim 7 wherein said moderator comprises a geometrical shape selected from the group consisting of: rectangular prisms, spheres, and cylinders.

13. A method for detecting neutrons comprising the steps of:
 forming a volume of neutron moderating material having a selected size and shape; and,
 measuring the thermal neutron flux in at least two pairs of locations within said volume, the first of said pairs being equidistant from a selected outside surface of said moderator and separated from said surface of said moderator by no more than 2 g/cm² areal density of said moderating material, and the second of said pairs being equidistant from a selected outside surface of said moderator and separated from said outside surface of said moderator by a greater density of moderating material than separates said first pair from said outside surface.

14. The method of claim 13 further comprising the step of: comparing the neutron fluxes measured at said two pairs of locations within said moderator to determine at least one characteristic attribute of said neutrons.

15. The method of claim 14 wherein said characteristic attribute of said neutrons comprises an attribute selected from the following group: neutron energy, neutron energy spectrum, general direction from which neutrons are being emitted, presence of a thermal neutron source, presence of a fast neutron source, presence of a source emmitting both fast and thermal neutrons, presence of a shielded neutron source, presence of fissile material, and isotopic composition of a neutron source.

* * * * *